US012736957B2

(12) United States Patent
Yang et al.

(10) Patent No.: US 12,736,957 B2

(45) Date of Patent: Sep. 15, 2026

(54) INTELLIGENT OPERATION AND MAINTENANCE CONTROL PLATFORM FOR SECONDARY POWER SYSTEM

(71) Applicant: Yunnan Power Grid Co., Ltd, Kunming City (CN)

(72) Inventors: Yuanhang Yang, Kunming City (CN); Dezhi Kong, Kunming City (CN); Shuying Pang, Kunming City (CN); Qiaowei Yang, Kunming City (CN); Hengchu Shi, Kunming City (CN); Hao You, Kunming City (CN); Benyu Li, Kunming City (CN); Minghui Zhao, Kunming City (CN); Min Zhang, Kunming City (CN); Jing Chen, Kunming City (CN); Jiong Chen, Kunming City (CN); Xiao Zhang, Kunming City (CN); Zebing Shi, Kunming City (CN); Tao He, Kunming City (CN); Yigong Xie, Kunming City (CN); Ming Zhao, Kunming City (CN); Yumin Chen, Kunming City (CN); Gang Chen, Kunming City (CN); Yunkun Deng, Kunming City (CN); Zaihe Yang, Kunming City (CN); Xin Wang, Kunming City (CN); Wei Fan, Kunming City (CN)

( * ) Notice: Subject to any disclaimer, the term of this patent is extended or adjusted under 35 U.S.C. 154(b) by 370 days.

(21) Appl. No.: 18/524,453

(22) Filed: Nov. 30, 2023

(65) Prior Publication Data

US 2025/0164984 A1 May 22, 2025

(30) Foreign Application Priority Data

Nov. 20, 2023 (CN) ........................ 202311543742.4

(51) Int. Cl.
*G05B 23/02* (2006.01)
*H02J 13/12* (2026.01)

(52) U.S. Cl.
CPC ....... *G05B 23/0245* (2013.01); *G05B 23/027* (2013.01); *H02J 13/12* (2026.01)

(58) Field of Classification Search
None
See application file for complete search history.

(56) References Cited

U.S. PATENT DOCUMENTS

2021/0014122 A1* 1/2021 Patil .................... H04L 12/2803

* cited by examiner

*Primary Examiner* — Sean Shechtman

(57) ABSTRACT

The invention discloses an intelligent operation and maintenance control platform and system for a secondary power system, belonging to field of power system operation and maintenance technology. The platform includes a interval layer, a transmission layer, a station control layer, a system layer, a platform layer, an application layer, and a disaster recovery backup centre. By collecting data from a security system and external information system, and sharing data with other application platforms of a secondary system, problems of omission, repetition, and isolation in current data collection are solved. Balancing the safety of production control area and the needs of advanced application development in information management area, ultimately achieving comprehensive data collection and deep mining, making the production and operation business of the power secondary system more smooth, meeting the professional needs of various professional operators, and achieving the improvement and efficiency of the secondary system.

8 Claims, 12 Drawing Sheets safety zone I-data collection and processing + control function data collection and processing at secure communication sub station remotely modifying settings remote throwing and retreating soft pressure plate security zone III-data collection and processing + advanced application development data collection and processing at external communication sub station receiving secure communication data from security zone I centralized monitoring real-time alarm historical alarms memorandum handover alarm archiving panoramic data geographical map trend chart topology interval chart substation diagram data maintenance tag library grammar library rule base patrolling from afar event patrol periodic inspection inspection report smart scheduling counter-measure management failure analysis maintenance management defect management status evaluation acceptance management risk management return management intelligent maintenance counter-measure work maintenance work ledger information defect handling status evaluation acceptance work equipment return

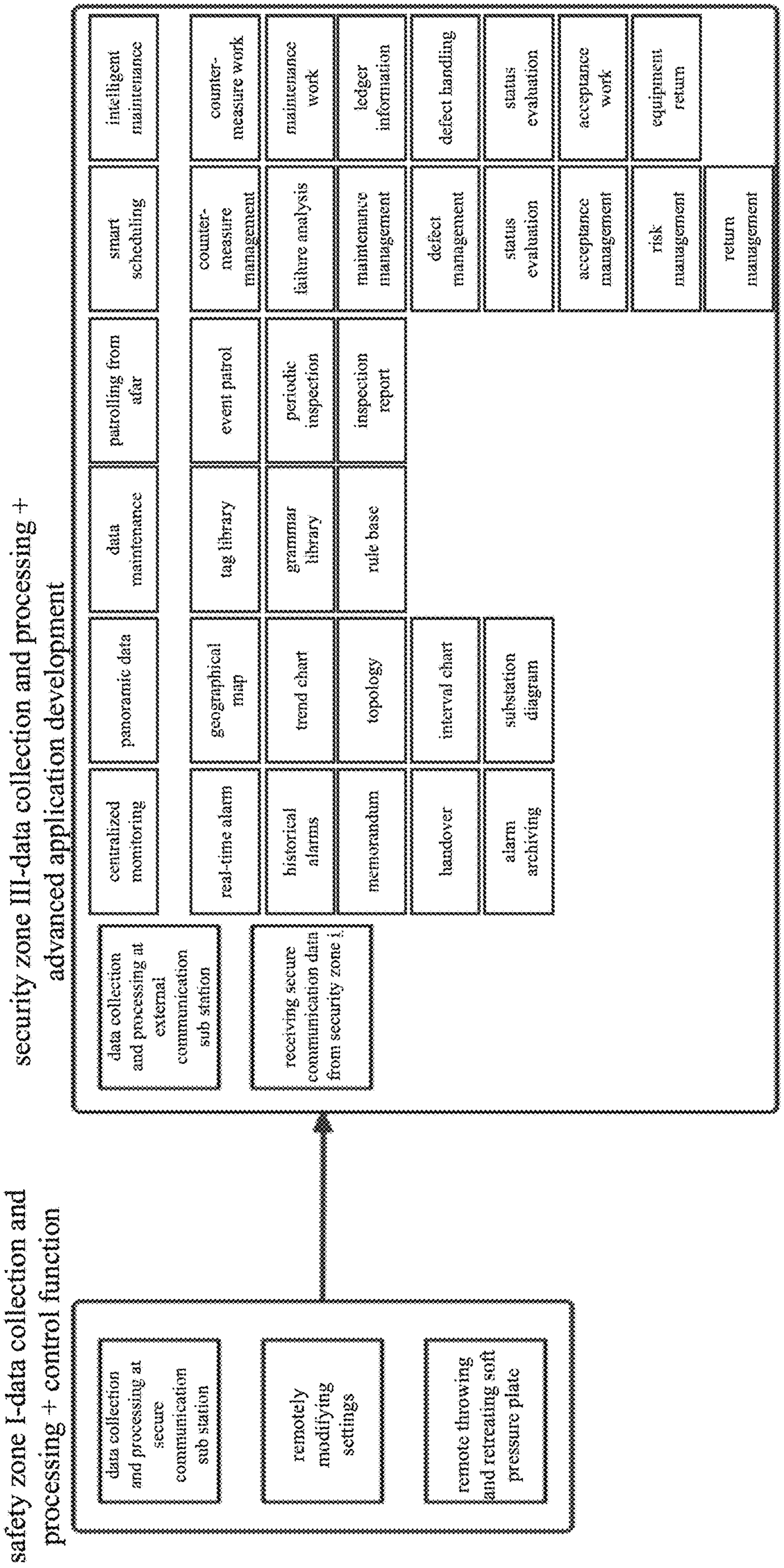

FIG. 5

INTELLIGENT OPERATION AND MAINTENANCE CONTROL PLATFORM FOR SECONDARY POWER SYSTEM

TECHNICAL FIELD

The invention relates to the technical field of operation and maintenance for power system, in particular to an intelligent operation and maintenance control platform for secondary power system.

BACKGROUND

The present invention relates to the technical field of operation and maintenance for power system, and relates to a digital production operation and maintenance control platform for power systems.

The traditional manual based secondary system operation and maintenance mode is no longer able to further improve the quality and efficiency of operation and maintenance. How to achieve the improvement and efficiency of secondary system operation and maintenance is an urgent research and solution issue. Technologies such as big data, the Internet of Things (IoT), and Artificial Intelligence (AI) bring opportunities for the innovative development of secondary system operation and maintenance technology.

At present, various technologies related to secondary equipment are flourishing. These technologies constantly shifting from manual judgement to intelligent algorithms, and from on-site work to remote operation, and fundamentally improves the quality and efficiency of secondary system operation and maintenance.

A patent with Publication Number CN114374269A discloses an intelligent inspection system based on secondary equipment operation and maintenance control platform for remote inspection. The inspection results are synchronized to Zone III through forward isolation device. A patent with Publication Number CN111934421A discloses a container based remote operation and maintenance system for converting stations, which remotely operates two devices through the secure Zone I network-power dispatch data network. A patent with the Publication Number CN106709580A discloses a converting station secondary system operation and maintenance cloud platform, which supports converting station operators to carry out monitoring, control, and maintenance services through the security zone I panoramic data platform and security zone III panoramic data platform. The patent applications described above involve security zone I, and the system functionality lacks scalability.

A patent with Publication Number CN114520543A discloses a secondary equipment operation and maintenance system for monitoring, operating, checking, and accepting secondary equipment. The monitoring is based on the collected panoramic information of the secondary equipment. A patent with Publication Number CN110739770A discloses a rely protection and control system based on information fusion. It integrates existing systems for panoramic data modelling and fault analysis. The panoramic information mentioned in the above patent is an integration of internal information of existing secondary devices, lacking external operational information that is necessary for the safe operation of secondary devices. It is not sufficient to fully reflect the action and operation of secondary devices. The panoramic information is used to support single service scenario and is not sufficient to support multi-services integration.

A patent with Publication Number CN106655522A discloses a main station system suitable for the operation and maintenance management of secondary equipment in a power grid, with the purpose of monitoring and inspecting secondary equipment for substation operators. A patent with Publication Number CN111641263A discloses an intelligent operation and maintenance system and method for secondary equipment based on 3D navigation, aimed at guiding substation maintenance personnel to carry out on-site maintenance operations. The above patents only involve a portion of the service groups involved in the production, operation, and maintenance of secondary systems.

In order to realize the deep integration of many new technologies and methods of secondary equipment, centralized scheduling, and further improve the quality and efficiency of secondary system operation, maintenance and management, the following problems still need to be solved.

There are a large number of secondary devices with a large amount of information, and many platforms and systems related to secondary devices need to collect data. However, there is a lack of interaction and low integration between various platforms and systems, resulting in isolated data. This leads to repetitive and omitted data collection, which in turn leads to the inability of various platform systems to achieve unified management and the inability of staff of secondary devices to deploy uniformly, low quality and efficiency in the operation, maintenance, and management of secondary equipment.

The existing platforms and systems are arranged in the production control area (I and II zones) with high security boundaries, which can collect some key information and have control function. However, the development of some advanced applications is difficult or even impossible. The other part of the platforms and systems are arranged in the information management area (III and IV areas), which can be used to advanced application development. However, the collection and control of some key information cannot be carried out, and the security boundary is lower than that of the production control area.

At present, the collection of external operational information for the secondary system is not comprehensive enough and relatively scattered, and has not been effectively integrated with existing power grid management platforms, OMS systems, and power grid management systems, resulting in the inability to monitor, maintain, and manage external operational information for the secondary system.

The application of data mining for the collected secondary system is not deep enough, and the data processing method is generally only applicable to a single type of data or a single system data. When a large amount of data is uploaded, there is lack of unified method and logic to manage and calculate the data. When various types of data are uploaded, more conclusions can be drawn by combining different types and aspects of data for analysis, and thus more functions can be implemented.

The production, operation, and maintenance business of the secondary power system can be divided into five parts: "operation, monitoring, inspection, maintenance, and dispatching". The existing offline or online management and control model only involves part of the business, and the closed-loop management of the entire business has not been truly realized. Each business process involves substation operation personnel, substation maintenance and testing personnel, professional management personnel of the dispatching department, and on-duty dispatchers. Different groups have different business contents and needs.

In summary, it is urgent to establish a digital system with data integration to avoid data omission, duplication, and isolation, and balance the needs of security in the production control area and advanced application development in the information management area, and ultimately realize data comprehensive collection and in-depth mining that will make the production, operation and maintenance business of the secondary power system smoother, and meet the professional needs of various professional operators, and improve the quality and efficiency of the secondary system.

SUMMARY OF INVENTION

In view of the existing problems in the aforementioned prior art, the present invention is proposed.

Therefore, the present invention provides an intelligent operation and maintenance control platform and system for power secondary systems, which can solve problems of data isolation, repeatability, and omission between different platforms in traditional secondary systems; It is difficult to simultaneously balance the security of production control regions and the development of advanced applications in information management regions. The secondary information collection is not comprehensive enough, and the application of data mining is not deep enough. The existing secondary platforms are difficult to meet the professional needs of various professionals.

To solve the above-mentioned technical problems, the present invention provides the following technical solution: an intelligent operation and maintenance control platform for a secondary power system, comprising:

Interval layer, transmission layer, station control layer, platform layer, system layer, application layer, and disaster recovery backup centre;

The interval layer includes all secondary devices for wired transmission and collection units for wireless transmission within the substation. The secondary equipment includes a protection device, a fault recording device, a traveling wave distance measurement device, a pressure plate monitoring device, a power quality device, and an AC/DC system. The data of the secondary equipment is transmitted to the wired transmission layer through wired transmission. The wireless transmission acquisition unit comprises a MEMS power supply and communication module, MEMS micro sensors, MEMS micro actuators, and collects external operating information of the secondary system transmitted wirelessly in the substation through microelectromechanical systems and RF MEMS technology. The wireless transmission acquisition unit is connected to the wireless transmission layer and sends the collected external operating information of the secondary system to the wireless receiving host of the wireless transmission layer. The external operation information of the secondary system includes the operation status information of the associated equipment of the secondary system, the behavior information of the on-site operation personnel of the relay protection device, and the environmental information of the substation.

As a preferred solution of the intelligent operation and maintenance control platform for the power secondary system described in the present invention, the transmission layer connects the interval layer and the station control layer, forwards the data from the interval layer to the station control layer. The transmission layer includes a wired transmission layer and a wireless transmission layer, wherein the wired transmission layer includes a Zone I wired transmission layer and a Zone III wired transmission layer, and the Zone I wired transmission layer includes a secure communication sub station switch and a secure communication sub station communication acquisition module. The communication acquisition module of the communication sub station is connected to the secondary equipment of the communication protocol within the station, while the switch of the communication sub station is connected to the secondary equipment of the communication protocol within the station;

The wired transmission layer in Zone III includes an external communication sub station switch, which is connected to the communication protocol of the interval layer equipment for transmitting data to the external communication sub station, and transmits the data of the interval layer equipment to the external communication sub station;

The wireless transmission layer comprises a wireless receiving host, which collects data sent by the wireless transmission collection unit within the station. The components of the wireless receiving host include an antenna, an RF front-end, an intermediate frequency amplifier, an intermediate frequency filter, a detector, and a demodulator.

As a preferred solution of an intelligent operation and maintenance control platform for a power secondary system described in the present invention, the station control layer comprises a secure communication sub station and an external communication sub station, wherein the secure communication sub station serves as a link between the interval layer and the main station platform through a transmission layer, and sends commands to the interval layer through the transmission layer, thereby changing the fixed value state and pressing plate state of the secondary equipment.

The external communication sub station collects external operation information of the secondary system, which has a data acquisition function. It collects external operation information of the secondary system sent on the wired transmission layer through the external communication sub station switch of the transmission layer, including AC/DC system information and power quality information.

Collecting external operation information of the secondary system transmitted on the wireless transmission layer, including information that cannot be transmitted through wired transmission in strong interference environments inside the outdoor switch field, and the external communication sub station does not have control functions.

The secure communication sub stations within the station control layer are arranged in Zone I of the security zone, connected to the Zone I platform of the platform layer through the dispatch data network. The external communication sub stations are arranged in Zone III of the security zone, connected to the Zone III platform of the platform layer through the comprehensive data network. Both the dispatch data network and the comprehensive data network have longitudinal encryption devices.

The station control layer receives control commands issued by the security zone I of the platform layer and forwards them to the interval layer through the transmission layer, achieving the control function of the platform layer on the equipment in the interval layer of the substation.

The station control layer receives data sent by the interval layer through the transmission layer and sends it to the platform layer.

As a preferred solution of an intelligent operation and maintenance control platform for a power secondary system described in the present invention, the platform layer is connected to the station control layer, receives data sent by the station control layer, and sends control commands to the station control layer through the Zone I of security zone. At the same time, it is connected to the system layer and has data interaction with the system layer.

The platform layer includes a control collection area and a data management application area, wherein the control collection area includes the collection of reliable data and the verification of the control function of the station control layer, ensuring the security of control and data collection. The data management application area includes the collection of external reliable data, advanced application development, and deep mining of data.

The control acquisition area and data management application area are connected through forward isolation devices and reverse isolation devices. The forward isolation devices and reverse isolation devices are used to isolate data exchange between Zone I of security zone and Zone III of security, using a TCP penetration method of forward isolation.

As a preferred solution of an intelligent operation and maintenance control platform for a power secondary system described in the present invention, the forward isolated TCP penetration method comprises: establishing a xb.tcp penetration adapter and a TCP_svr forward receiver in the Zone I of the security zone server; and establishing a xb.tcp adapter in the Zone III of the security zone server, wherein a path 1 of the platform's control collection area is to send standard TCP message to the TCP_svr forward receiver and converts to xb_tcp message, and send to the xb.tcp penetration adapter, wherein a path 2 of the platform's control collection area is directly sending the xb_tcp message to the xb.tcp penetration adapter, and the xb.tcp penetration adapter generates a forward driver and establishes a TCP mapping with the data management application area server, and a one-way TCP message is sent to a specific port of the xb.tcp adapter in the data management application area through the forward isolation device, and, finally, the platform data management application area stores and decodes the data, wherein the TCP penetration method of the forward isolation adopts xb_gl_proxy implementation, wherein a configuration item is:

establish mapping of CHANNEL SVR of the data management application area in the control collection area, $$\text{CHANNEL REMOTE } SVR = 10.10.10.2\text{: } xxxx$$

an adapter service port, $$\text{PROXY PORT} = xxxx;$$

wherein the control collection area tcp is connected to the xxxx port of the service, and, through a xb penetration mechanism, it is equivalent to connecting to a user machine in the data management application area, $$zf1 = xxxx\ 192.1.1.2\text{: } xxxx,$$

wherein the control collection area receives remote control commands from a power dispatch automation OCS system and send the remote control commands to the secure communication sub station of the station control layer, comprising remote control modification of fixed values and remote control of soft pressing plate, wherein the data management application area is connected to an OMS system, and the data application area retrieves corresponding fixed value orders and power outage application forms from the OMS system, and sends conclusions of real-time data on station side and opinions of application approval personnel to a power outage application module of the OMS system, wherein the data management application area is connected to a power grid management system and retrieves equipment ledger data from the power grid management system, wherein the data management application area is connected to a video image monitoring system, which retrieves videos of the substation internal environment, operators, and equipment before and after a moment of fault, and, based on an environmental status, an equipment status, and human behavior, a pre fault accident analysis is carried out to determine whether the fault occurred due to environmental, equipment, and human factors, and, after the fault, videos of environment status and equipment status are used, and quickly determines whether there are conditions for power restoration and reduce power outage time, wherein the data management application area is connected to a substation management platform, and an analysis result data obtained from an advanced application is sent to the substation management platform.

As a preferred solution of an intelligent operation and maintenance control platform for a power secondary system described in the present invention, wherein: the application layer is directly connected to the platform layer;

The application layer includes scheduling, operation, and maintenance extension workstations;

The disaster recovery backup center includes a disaster recovery system and a storage backup system.

As a preferred solution of an intelligent operation and maintenance control platform for a power secondary system described in the present invention, the advanced application comprises device lifecycle management and defect modeling;

The full life cycle management of the equipment includes acceptance of the equipment to be put into operation, recording the acceptance records in the acceptance management module of the platform, and closed-loop acceptance plan. After passing the acceptance, the equipment is put into operation. If it fails the acceptance, the construction unit will rectify it, and the new equipment that passes the acceptance will be put into production. Maintenance work will be carried out when it is put into production.

As a preferred solution of an intelligent operation and maintenance control platform for a power secondary system described in the present invention, the defect modeling comprises:

a platform defect management module collecting abnormal alarm signals from a remote inspection module or a centralized monitoring module; and a defect management module automatically collecting key information of alarms based on an alarm information, wherein the key information comprises:

a device name;

an alarm level;

an alarm representation; and an alarm logic, wherein the alarm representation is analyzed and judged based on the alarm logic in a rule library of a platform accessing device, combined with the alarm level to detect the abnormal alarm signals, wherein the alarm logic comprises:

a numerical alarm; and a status alarm, wherein the numerical alarm comprises:

values that have reached or not reached a first threshold, and are compared by calculating an actual value and setting an alarm value;

when the calculation result conforms to a logic, an alarm is confirmed and automatically transferred to a defect module;

when the calculation result does not conform to the logic, it is a false alarm and the logic ends;

when a main system detects an overload alarm from a main transformer protection, an alarm logic module retrieves a setting value of the main transformer protection overload from the rule library, and combines real-time current analysis to determine whether an alarm setting value has been reached;

if the alarm setting value is reached, confirm the alarm and switch to the defect module; and if the alarm setting value is not reached, it is judged as a false alarm and the logic ends, wherein the status alarm comprises:

an alarm signal issued by a detection device for abnormal state;

perform secondary confirmation of device name and status based on alarm signals;

if device status meets an alarm information, confirm an alarm and automatically convert it to the defect module, automatically convert the key information of an alarm signal into defect factors, and at the same time, retrieve an operating information of an alarm device and conduct defect modeling, $$X_i = \mu_i + a_{i1}f_{i1} + a_{i2}f_{i2} + a_{i3}f_{i3} + a_{i4}f_{i4} + \varepsilon_i (1 < i \le 12)$$

while the Xi (1≤i≤12) represents 12 possible causes of defects, comprising:

plug-in damage;

loose terminals;

incorrect labeling;

program jamming;

incorrect secondary circuit connections;

air switch tripping;

insulation abnormalities;

parasitic circuits;

water ingress into auxiliary components;

damage to auxiliary components;

program vulnerabilities; and incorrect alarm definitions, and f1, f2, f3, and f4 represent four common factors. $a_{ij}$ is $X_i$ is load in common factor fi, and μi is the mean of $X_i$, εi represents other factors that do not belong to the common factor;

transform the above equation and calculate it using a matrix method to get:

$$X = \mu + Af + \varepsilon$$

while f=(f1, f2, f3, f4) is common factor vector, and ε=(ε1, ε2, . . . , ε12) is special factor vector;

then $A_{12\times4}=a_{ij}$ (1≤i≤12), (1≤j<4) is cause of defect occurrence of factor load matrix, rank of matrix A is m, when fulfilling:

$$E(f) = 0,$$

$$E(\varepsilon) = 0,$$

$$\mathrm{Var}(f) = I,$$

$$\mathrm{Var}(\varepsilon) = D = \mathrm{diag}(\sigma_1^2, \sigma_2^2, \ldots, \sigma_p^2),\ 1 \le p \le 12, \text{ and}$$

$$\mathrm{cov}(f, \varepsilon) = E(f\varepsilon) = 0, \text{ than}$$

$$\mathrm{Var}(x) = E[(X-\mu)(X-\mu)'] = AA' + D,$$

and element $a_{ij}$ of A is a covariance between a likelihood of defect occurrence and a common factor fi:

$$a_{ij} = \mathrm{cov}(X_i, f_i) = \rho(X_i, f_i)$$

wherein E (f) represents comprehensive expectation of discrete common factor vector f1-f4, E (ε) represents comprehensive expectation of discrete special factor vector,Var (ε) is the variance of a special factor vector, which describes a discrete degree of the special factor vector ε, cov (f, ε) represents the covariance matrix of the common factor vector f and the special factor vector ε;

wherein the likelihood of the defect occurring depends on the four common factors, represented by the sum of squares of the row elements of A:

$$h_i^2 = \sum_{j=1}^{4} a_{ij}^2$$

than $$\mathrm{Var}(X_i) = h_i^2 + \sigma_i^2\ (1 \le i \le 12),$$

wherein $$h_i^2$$

is contributes of common factors to the likelihood of defect occurrence, $$\sigma_i^2$$

represents the contribution of special factors to the likelihood of defect occurrence, if $X_i$ is ultimately calculated to have the highest value, the most likely defect cause is the i-th item;

wherein, based on cause of defect, defect level, defect equipment, and defect occurrence time, should eliminate key information of the defect time and automatically filled out in defect work order and dispatched to maintenance personnel.

A computer device comprising a memory and a processor, wherein the memory stores a computer program, characterized in that when the processor executes the computer program, it implements the steps of any method described in an intelligent operation and maintenance control platform for a power secondary system.

A computer-readable storage medium storing computer programs, characterized in that when the computer programs are executed by a processor, the steps of implementing any of the methods described in an intelligent operation and maintenance control platform for power secondary systems are implemented.

The beneficial effects of the present invention include: 1. breaking through numerous secondary platform barriers, improving data exchange, achieving data sharing, eliminating data isolation, avoiding duplicate or omitted data collection, achieving unified management of the platform, unified deployment of operators, and improving the quality of operation and management of secondary equipment.

2. Adopting the platform architecture of "Zone I collection+control" and "Zone III collection+advanced application development", the data from Zone I is mapped to Zone III for advanced application development, breaking the situation of secure Zone I data silos and insufficient Zone III data, achieving information sharing, ensuring the security of Zone I while also taking into account the needs of advanced application development in Zone III.

3. By comprehensively collecting, monitoring, managing and analyzing the external operation information of the secondary system, the shortcomings of the existing system's incomplete collection have been compensated, and the collection and management of full information of relay protection devices have been achieved. The above information, combined with existing systems and platforms, can carry out deeper integration of full information of relay protection, thereby better operation, maintenance and management of relay protection equipment.

4. By combining the "rule library", "label library", and "syntax library" in the platform, intelligent rules, labels, and syntax can be used to make more efficient and accurate judgments for common fixed value data, inspection and maintenance data, fault data, and other daily work in secondary systems. This effectively solves the problem of insufficient data mining and insufficient functional implementation in existing platforms.

5. It includes five major parts: operation, monitoring, inspection, maintenance, and scheduling, truly achieving closed-loop management of the entire business process, meeting the professional needs and business scenarios of repair and testing personnel, operation personnel, and scheduling personnel, thereby helping secondary operators reduce workload and increase efficiency.

BRIEF DESCRIPTION OF DRAWINGS

In order to provide a clearer explanation of the technical solution of the embodiments of the present invention, a brief introduction will be made to the accompanying drawings required in the description of the embodiments. It is evident that the accompanying drawings are only some embodiments of the present invention. For those skilled in the art, other accompanying drawings can be obtained based on these drawings without creative labor. Among them:

FIG. 5 shows the application distribution diagram of the security I and III zones of an intelligent operation and maintenance control platform for a power secondary system provided in one embodiment of the present invention;

DETAILED DESCRIPTION OF THE INVENTION

Figure 1:
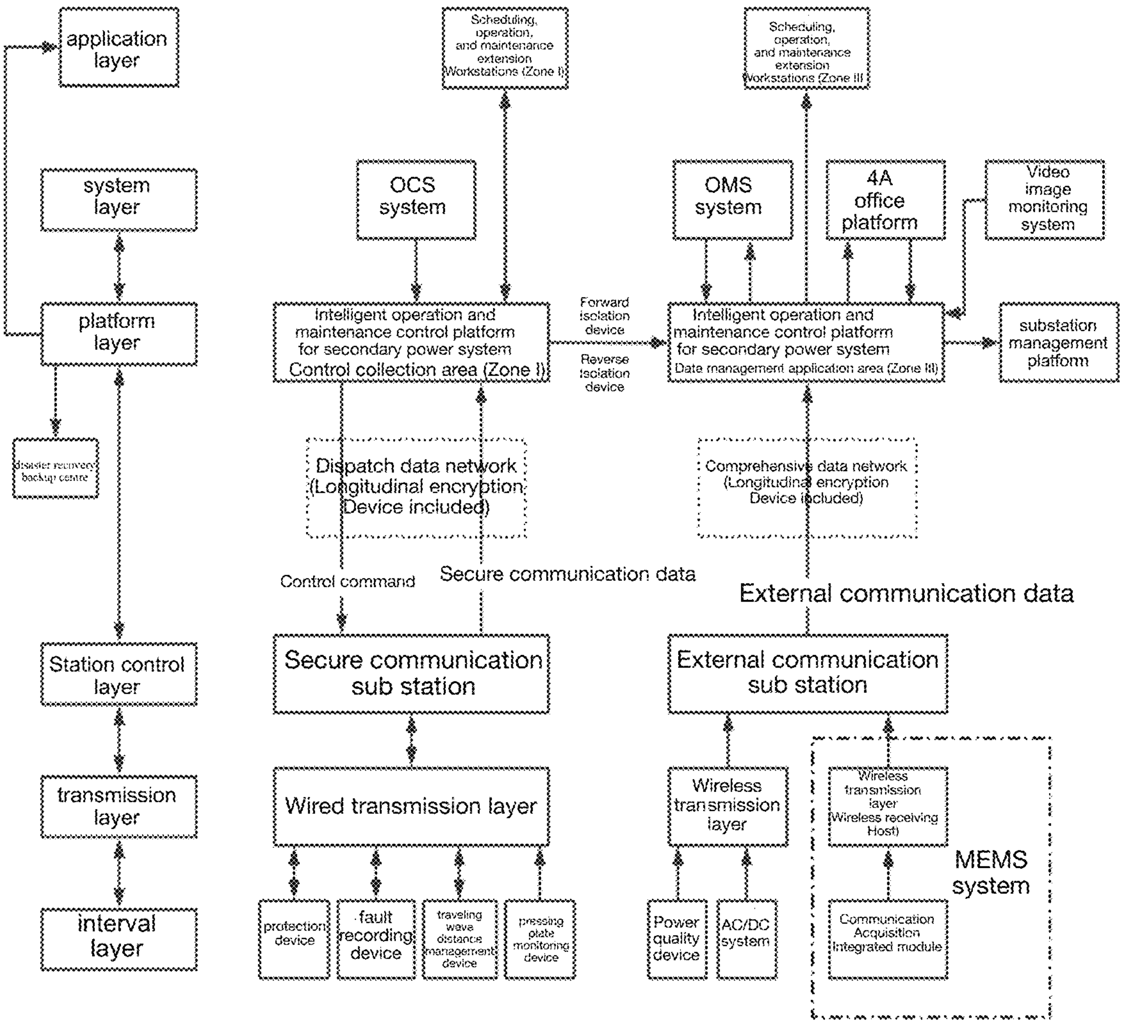
FIG. 1 shows the composition diagram of an intelligent operation and maintenance control platform for a power secondary system provided in one embodiment of the present invention.

In order to make the above objectives, features, and advantages of the present invention more obvious and easy to understand, the specific embodiments of the present invention will be explained in detail below in conjunction with the accompanying drawings of the specification. Obviously, the described embodiments are part of the embodiments of the present invention, not all of them. Based on the embodiments in the present invention, all other embodiments obtained by ordinary persons in the art without creative labor shall fall within the scope of protection of the present invention.

Many specific details are elaborated in the following description to facilitate a full understanding of the present invention. However, the present invention can also be implemented in other ways different from those described herein. Those skilled in the art can make similar promotions without violating the content of the present invention. Therefore, the present invention is not limited by the specific embodiments disclosed below.

Secondly, the term "one embodiment" or "embodiment" referred to here refers to specific features, structures, or features that can be included in at least one implementation of the present invention. The term "in one embodiment" appearing in different parts of this specification does not necessarily refer to the same embodiment, nor is it a separate or selectively mutually exclusive embodiment with other embodiments.

The present invention is described in detail in conjunction with a schematic diagram. When elaborating on embodiments of the present invention, for the convenience of explanation, the cross-sectional diagram representing the device structure will not be locally enlarged according to the general scale, and the schematic diagram is only an example, which should not limit the scope of protection of the present invention. In addition, in actual production, three-dimensional spatial dimensions of length, width, and depth should be included.

Meanwhile, in the description of the present invention, it should be noted that the orientation or position relationship indicated by the terms "up, down, inside, and outside" is based on the orientation or position relationship shown in the drawings, and is only for the convenience of describing the present invention and simplifying the description, rather than indicating or implying that the device or element referred to must have a specific orientation, be constructed and operated in a specific orientation, and therefore cannot be understood as a limitation of the present invention. In addition, the terms "first, second, or third" are only used to describe the purpose and cannot be understood as indicating or implying relative importance.

In the present invention, unless otherwise specified and limited, the term "installation, connection, connection" should be broadly understood, for example: it can be a fixed connection, a detachable connection, or an integrated connection; It can also be a mechanical connection, an electrical connection, a direct connection, an indirect connection through an intermediate medium, or an internal connection between two components. For ordinary technical personnel in this field, the specific meanings of the above terms in the present invention can be understood in specific situations.

Example 1

Referring to FIGS. 1 to 12, the first embodiment of the present invention provides an intelligent operation and maintenance control platform and system for a power secondary system, comprising:

As shown in FIG. 1, the interval layer, transmission layer, station control layer, platform layer, system layer, application layer, and disaster recovery backup center.

The inverval layer includes all secondary devices for wired transmission and collection units for wireless transmission within the substation.

The secondary equipment includes a protection device, a fault recording device, a traveling wave distance measurement device, a pressure plate monitoring device, a power quality device, and an AC/DC system. The data of the secondary equipment is transmitted to the wired transmission layer through wired transmission.

The wireless transmission acquisition unit adopts Internet of Things technology, including MEMS power supply and communication modules, MEMS microsensors, MEMS micro actuators, and uses microelectromechanical systems and RF MEMS technology to collect external operating information of the secondary system transmitted wirelessly in the substation. The wireless transmission acquisition unit is connected to the wireless transmission layer and sends the collected external operating information of the secondary system to the wireless receiving host of the wireless transmission layer.

The external operation information of the secondary system includes the operation status information of the associated equipment of the secondary system, the behavior information of the on-site operation personnel of the relay protection device, and the environmental information of the substation.

The transmission layer connects the interval layer and the station control layer, forwarding the data from the interval layer to the station control layer. The transmission layer includes a wired transmission layer and a wireless transmission layer, wherein the wired transmission layer includes a Zone I wired transmission layer and a Zone III wired transmission layer. The Zone I wired transmission layer includes a communication acquisition module for the secure communication sub station switch and the secure communication sub station 103 communication acquisition module. The secure communication substation switch is connected to the secondary equipment of the 61850 communication protocol in the station, Connect the communication acquisition module of secure communication sub station 103 to the secondary equipment of the communication protocol of station 103.

The wired transmission layer in Zone III includes an external communication sub station switch, which is connected to the partition layer equipment of the 61850 communication protocol that requires data transmission from the external communication sub station, and transmits the data of the equipment to the external communication sub station.

Figure 2:
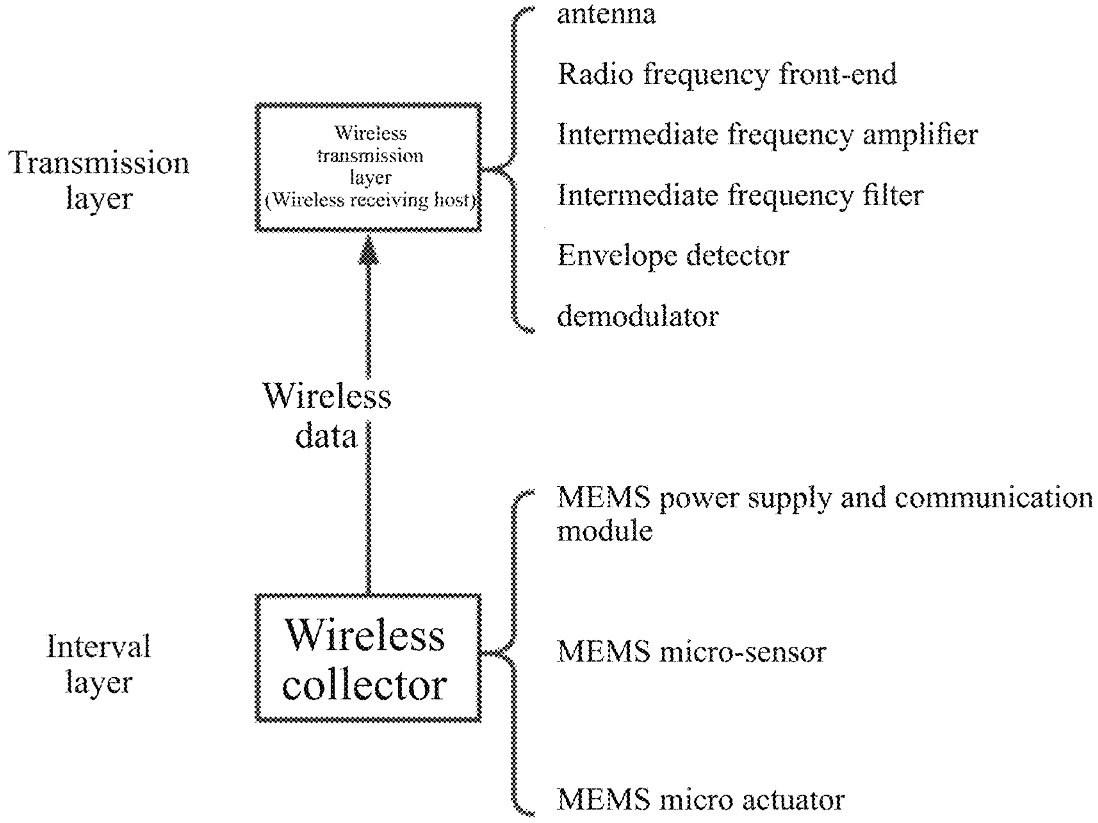
FIG. 2 shows the composition diagram of a wireless transmission microelectromechanical system for an intelligent operation and maintenance control platform of a power secondary system provided in an embodiment of the present invention.

As shown in FIG. 2, the wireless transmission layer includes a wireless receiving host, which mainly collects data sent by the wireless transmission collection unit within the station. The main components of the wireless receiving host include an antenna, RF front-end, intermediate frequency amplifier, intermediate frequency filter, detector, and demodulator. The antenna is a device that receives radio signals, converts radio signals into electrical signals, and transmits the electrical signals to the RF front-end, The RF front-end is the core part of the RF receiver, mainly responsible for converting electrical signals into intermediate frequency signals, amplifying and filtering them. The intermediate frequency amplifier and intermediate frequency filter further amplify and filter the intermediate frequency signals to improve signal quality. The detector and demodulator convert the intermediate frequency signals into digital signals, which are further transmitted to external signal substations.

The station control layer includes a secure communication sub station and an external communication sub station. The secure communication sub station serves as a link between the partition layer and the main station platform through the transmission layer, and has the function of transmitting secure communication information such as current, voltage, fixed value, and waveform recording. After a protection action occurs, the secure communication information is transmitted by the secure communication system, providing effective support for the dispatch duty officer to further restore the power grid. The secure communication sub station also has control functions and is arranged in Zone I of security zone, solved the problem of requiring higher security boundaries for the secure communication sub station. The secure communication sub station receives control commands from the platform layer platform (Zone I) and sends them to the interval layer through the transmission layer, thereby changing the fixed value status and pressure plate status of the secondary equipment.

The external communication sub station mainly collects external operation information of the secondary system. The external communication sub station has a data acquisition function, and collects external operation information of the secondary system sent on the wired transmission layer through the external communication sub station switch of the transmission layer, including AC/DC system information and power quality information. It collects external operation information of the secondary system sent on the wireless transmission layer, mainly including information that cannot be transmitted through wired under strong interference environment in the outdoor switch field, The external communication sub station does not have control function and is located in Zone III of the security zone. The external communication data is transmitted to the platform layer platform (Zone III) through a comprehensive data network, solving the problem of poor security in wireless transmission compared to wired transmission.

The secure communication sub stations within the station control layer are arranged in Zone I of the security zone, connected to the Zone I platform of the platform layer through the dispatch data network. The external communication sub stations are arranged in Zone III of the security zone, connected to the Zone III platform of the platform layer through the comprehensive data network. Both the dispatch data network and the comprehensive data network have vertical encryption devices. The vertical encryption device converts the data sent by the security sub stations and external security sub stations from plaintext to ciphertext, and decodes it by the main station, enhance security.

The station control layer receives control commands issued by the security zone I of the platform layer and forwards them to the interval layer through the transport layer, achieving the control function of the platform layer on the equipment in the interval layer of the substation.

The station control layer receives data sent by the interval layer through the transmission layer and sends it to the platform layer.

The platform layer is connected to the station control layer, receives data sent by the station control layer, and sends control commands to the station control layer through the Zone I of security zone. At the same time, it is connected to the system layer and has data interaction with the system layer.

The platform layer comprises a control acquisition area (Zone I) and a data management application area (Zone III), wherein the control acquisition area (Zone I) includes the control function of collecting and verifying reliable data with the station control layer, ensuring the security of control and data collection. The data management application area (Zone III) includes the collection of external information data, advanced application development, and deep mining of data.

The control acquisition area (Zone I) and data management application area (Zone III) are connected through forward isolation devices and reverse isolation devices. The forward isolation devices and reverse isolation devices are used to isolate data exchange between safe Zone I and safe Zone III. The TCP penetration method of forward isolation is used to send specific data from the control acquisition area (Zone I) to the data management application area (Zone III) through the forward isolation device, and advanced applications of data are carried out, And the information and data in the data management application area (Zone III) cannot be transmitted to the control acquisition area (Zone I) through reverse isolation devices, further ensuring the security of the control acquisition area (Zone I).

The forward isolation TCP penetration method involves establishing an xb.tcp penetration adapter and TCP_svr on a Zone I of security zone server, establishes an xb.tcp adapter on the Zone III of security zone server, and the path 1 of the platform's control acquisition area (Zone I) is to send standard TCP packets to TCP_avr forwarding receiver converts to xb_rcp message, sent to the xb.tcp penetration adapter, path 2 of the platform's control acquisition area (Zone I) is to directly transmit xb_tcp message to the xb.tcp penetration adapter, which generates a forward driver and establishes a TCP mapping with the data management application area (Zone III) server. The one-way TCP message is sent to the specific port of the xb.tcp adapter in the data management application area (Zone III) through the forward isolation device. Finally, the data is stored and decoded by the platform data management application area (Zone III).

Figure 3:
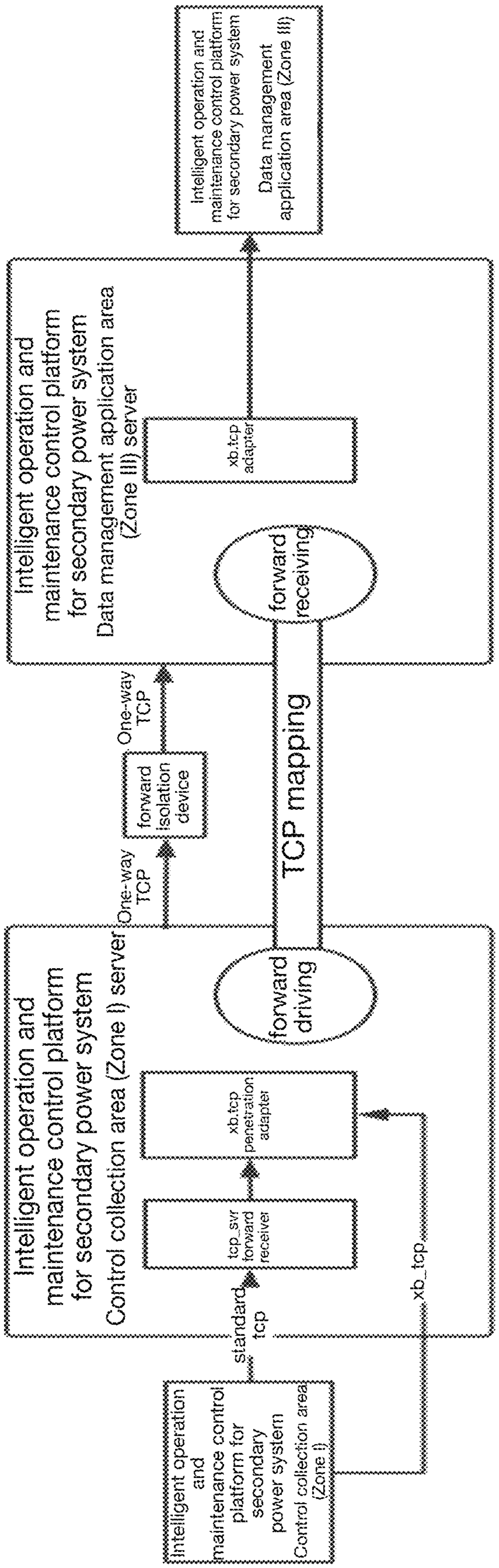
FIG. 3 shows the structure diagram of a forward isolated TCP penetration method for an intelligent operation and maintenance control platform of a power secondary system provided in an embodiment of the present invention.

As shown in FIG. 3, the forward isolated TCP penetration method adopts xb_gl_proxy implementation, where the configuration items are:

establish mapping of CHANNEL SVR of the data management application area in the control collection area, $$\text{CHANNEL REMOTE } SVR = 10.10.10.2{:}\,xxxx$$

an adapter service port, $$\text{PROXY PORT} = xxxx;$$

wherein the control collection area tcp is connected to the xxxx port of the service, and, through a xb penetration mechanism, it is equivalent to connecting to a user machine in the data management application area, $$zf1 = xxxx\ 192.1.1.2{:}\,xxxx,$$

The control acquisition area (Zone I) belongs to the production control area with the highest security level of the power monitoring system. It adopts a C/S client server architecture and programming language of C/C++, which has high development and maintenance costs, complex approval processes, and high time and labor costs. The data management application area (Zone III) belongs to the management information area with the second highest security level of the power monitoring system compared to the non control area. It adopts a B/S browser server architecture and programming language of Java, Low development and maintenance costs.

The control acquisition area (Zone I) can receive remote control commands from the power dispatch automation OCS system and send them to the signal protection sub station of the station control layer, including remote control modification of fixed values, remote control of soft pressure plates, etc. It is also connected to the dispatch, operation, and maintenance extension workstation (Zone I) to extend the acquisition and control functions to professionals in the dispatch, operation, and maintenance specialties, meeting the needs of various specialties, Improve the quality and efficiency of the operation, maintenance, and management of the secondary system.

The data management application area (Zone III) is connected to the OMS system (scheduling production management system). The data management application area (Zone III) retrieves corresponding fixed value orders and power outage application forms from the OMS system, and sends the conclusions of real-time data on the station side and the opinions of the application approval personnel to the power outage application module of the OMS system, providing simplification and convenience for the power outage application process, Provided a basis for the approval and judgment of power outage applications.

The data management application area (Zone III) is connected to the power grid management system, and the equipment ledger data of the power grid management system is retrieved. Combined with the new equipment operation application module of the OMS system, the full life-cycle management of secondary equipment is achieved. At the same time, the defect management module data of the power grid management system is retrieved, including at least historical defects and historical defect elimination plans, in conjunction with real-time data sent by the inter station partition layer, you can roughly determine the cause of the defect and the elimination plan for the defect.

The data management application area (Zone III) is connected to a video image monitoring system, which retrieves videos of the substation's internal environment, operators, and equipment before and after the fault moment. Based on the status of the environment, equipment, and human behavior, pre fault analysis is conducted to determine whether the fault occurred due to environmental, equipment, and human factors, After a malfunction, it is possible to quickly determine whether there are conditions for power restoration and reduce power outage time by monitoring the environmental and equipment status videos.

The data management application area (Zone III) is connected to the substation management platform, and the analysis results data obtained from advanced applications are sent to the substation management platform, providing reliable criteria for the substation management platform to judge primary equipment and effectively achieving the fusion of primary and secondary data.

The application layer is directly connected to the platform layer, and daily on-site work, such as switching on and off soft pressure plates, is carried out remotely online. The control function and advanced applications are extended from the platform to operation, maintenance, scheduling and other specialties, further achieving professional integration, effectively reducing on-site work burden, and meeting the different needs of various specialties.

The application layer includes scheduling, operation, and maintenance extension workstations (Zone I), scheduling, operation, and maintenance extension workstations (Zone III).

Among them, the dispatching, operation, repair and test extension workstation (Zone I) is in dual configuration. The two workstations cooperate with each other, and the hard disk data are independent. When the control function is executed, one person operates and one person monitors. After the operator of workstation 1 correctly fills in the operation ticket, the operator of workstation 1 sends the operation ticket to the operator of workstation 2 for review. The operation ticket can be executed after the review is correct. When the operation is executed, both operators are in workstation 1, and one operator is in monitoring, After the execution is completed, both parties will check the status of the operated equipment in workstation 2.

The dispatch, operation, and maintenance extension workstation (Zone III) is a single set configuration, mainly meeting the extension of advanced applications in Zone III of the platform, realizing platform value, and meeting the needs of various professionals.

The disaster recovery backup intre includes a disaster recovery system and a storage backup system, wherein the disaster recovery system includes a data backup and recovery management platform, a disaster recovery all-in-one machine server, a large capacity hard disk, and a confidentiality system. The storage backup system at least includes a storage backup platform, a storage backup server, and a large capacity hard disk. The disaster recovery backup center at least includes one remote disaster recovery center and two local disaster recovery centers, The local disaster recovery center consists of a production center and a local disaster recovery center. The local disaster recovery center uses remote replication to backup real-time data from the production center, while the remote disaster recovery center uses asynchronous remote replication to backup data from the local disaster recovery center.

The advanced applications include device lifecycle management and defect modeling.

Figure 4:
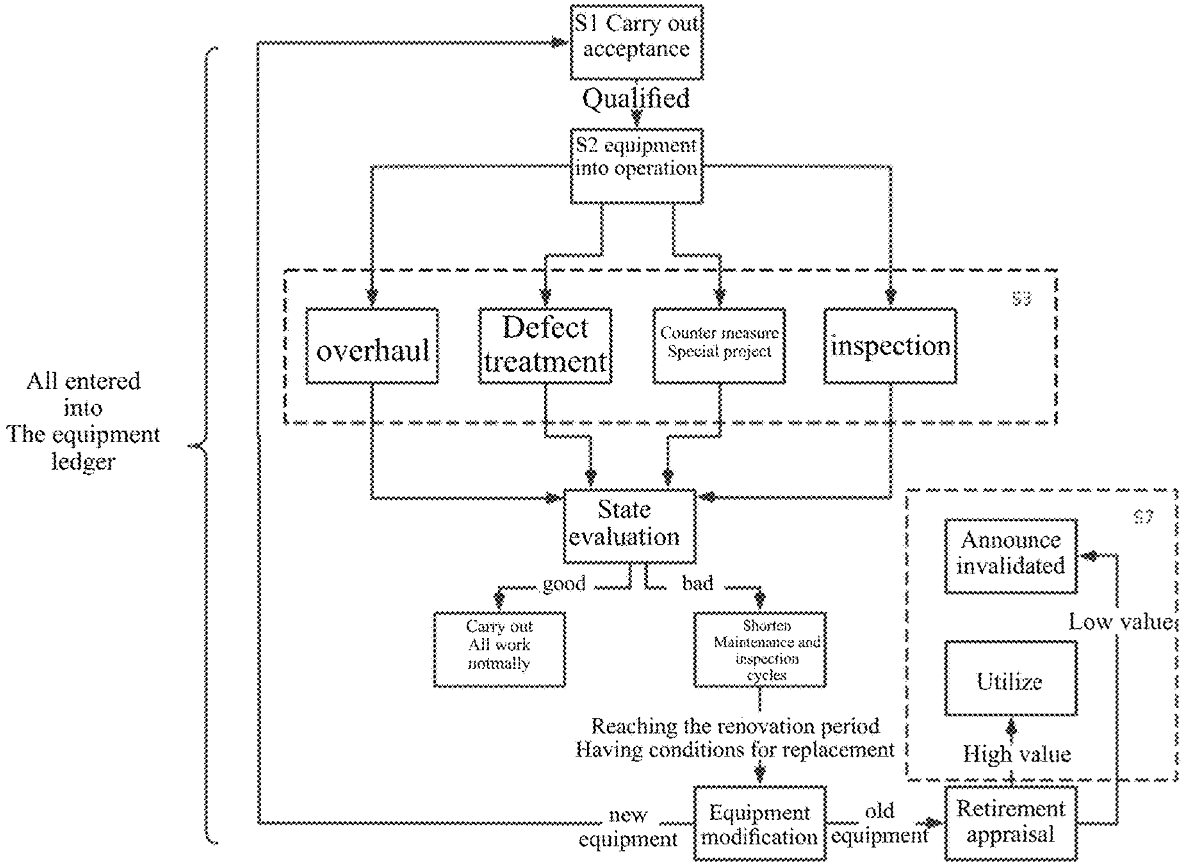
FIG. 4 is a flowchart of a device lifecycle management method for an intelligent operation and maintenance control platform of a power secondary system provided in an embodiment of the present invention.

As shown in FIG. 4, the full life cycle management of the equipment includes acceptance of the equipment to be put into operation, recording acceptance records in the acceptance management module of the platform, and closed-loop acceptance plan. After passing the acceptance, the equipment is put into operation. If it fails the acceptance, the construction unit will make corrections. The new equipment that passes the acceptance will be put into production, and maintenance work will be carried out when it is put into production. The maintenance work includes inspection, elimination of defects Counter measures, special work, and inspection work are carried out to evaluate the status of equipment. Based on the maintenance situation, whether there are abnormalities during inspection, the operating years of the device, and whether there are frequent defects, a comprehensive consideration is given to evaluate the status of the equipment. If the evaluation results are good, normal operation and maintenance are maintained. If the evaluation results are poor, the maintenance cycle and inspection cycle need to be shortened. For equipment with poor evaluation results that meet the transformation cycle and conditions, then carry out technical renovation work, replace the equipment, and if it passes the acceptance inspection, proceed to the acceptance stage. Retirement appraisal will be carried out on the replaced equipment, equipment with high residual value will be recycled, and equipment with low residual value will be scrapped.

The defect modeling includes the platform defect management module collecting abnormal alarm signals from the remote inspection module or centralized monitoring module, the defect management module automatically collecting key information of the alarm based on the alarm information, including equipment name, alarm level, alarm appearance, alarm logic, equipment name is the dual name of the alarm equipment, the alarm level is divided into 4 levels, and the first level alarm is a red alarm, The second level alarm is an orange alarm, the third level alarm is a yellow alarm, and the fourth level alarm is a blue alarm. The first level alarm is the most severe and urgent, while the fourth level alarm is the least significant and has a relatively small impact. The first level alarm corresponds to an emergency defect, which can be eliminated within 12 hours. The second level alarm corresponds to a major defect, which can be eliminated within 72 hours. The third and fourth level alarms correspond to a general defect, which can be eliminated within 3 months.

The alarm representation includes alarm logic, which is the alarm logic retrieved by the platform from the rule library of the device. Combined with the alarm representation, it analyzes whether the alarm is a normal alarm. The alarm logic is divided into numerical alarm and status alarm. If the numerical alarm reaches or does not reach a certain value, it will sound an alarm. For this type of alarm, the actual value and setting value will be calculated and compared. When the load logic of the calculation result is calculated, the alarm will be confirmed and automatically transferred to the defect module, When the calculation result does not conform to the logic, it is a false alarm and the logic ends. When the main transformer protection sends an overload alarm, the alarm logic module retrieves the setting value of the main transformer protection overload in the rule library, and combines real-time current analysis to determine whether the alarm setting value has been reached. If the alarm value is reached, the alarm is confirmed and converted to a defect. If the setting value is not reached, it is judged as a false alarm and the logic ends.

State alarm is an alarm issued to detect abnormal device status. This type of alarm can be confirmed based on the device name and status. If the device status matches the alarm information, the alarm will be confirmed and automatically converted to a defect. Key information such as device name, alarm level, alarm appearance, and alarm logic in the alarm information will be automatically converted to defect factors. At the same time, the operation time, device type, and DC system of the alarm device will be retrieved, Environmental temperature, maintenance status, inspection status, key information on historical defect causes, and defect modeling, List the common causes of defects in this device:

Plugin damage, loose terminals, identification errors, program jamming, secondary circuit connection errors, air switch tripping, insulation abnormalities, parasitic circuits, auxiliary component water ingress, auxiliary component damage, program vulnerabilities, and alarm definition errors. Among them, by standardizing the 12 causes of defects mentioned above, the causes of defects can be classified into four categories: operating years, operating environment, equipment manufacturer, and maintenance situation, Each category is called a common factor, and the following factor model can be used between the 12 causes of defects and the 4 common factors mentioned above:

$$X_i = \mu_i + a_{i1} f_{i1} + a_{i2} f_{i2} + a_{i3} f_{i3} + a_{i4} f_{i4} + \varepsilon_i (1 < i \le 12)$$

while the $X_i$ ($1 \le i \le 12$) represents 12 possible causes of defects, f1, f2, f3, and f4 represent four common factors. $a_{ij}$ is $X_i$ is load in common factor $f_i$, and $\mu_i$ is the mean of $X_i$, εi represents other factors that do not belong to the common factor.

Transform the above equation and calculate it using a matrix method to get:

$$X = \mu + Af + \varepsilon$$

while f=(f1, f2, f3,f4) is common factor vector, and ε=(ε1, ε2, . . . , ε12) is special factor vector;

then $A_{12\times4} = a_{ij}$ ($1 \le i \le 12$), ($1 \le j \le 4$) is cause of defect occurrence of factor load matrix, rank of matrix A is m, when fulfilling:

$$E(f) = 0,$$

$$E(\varepsilon) = 0,$$

$$\mathrm{Var}(f) = I,$$

$$\mathrm{Var}(\varepsilon) = D = \mathrm{diag}(\sigma_1^2, \sigma_2^2, \ldots, \sigma_p^2),\ 1 \le p \le 12, \text{ and}$$

$$\mathrm{cov}(f, \varepsilon) = E(f\varepsilon) = 0, \text{ than}$$

$$\mathrm{Var}(x) = E[(X-\mu)(X-\mu)'] = AA' + D,$$

and element $a_{ij}$ of A is a covariance between a likelihood of defect occurrence and a common factor fi:

$$a_{ij} = \mathrm{cov}(X_i, f_i) = \rho(X_i, f_i)$$

wherein E (f) represents comprehensive expectation of discrete common factor vector f1-f4, E (ε) represents comprehensive expectation of discrete special factor vector, Var (ε) is the variance of a special factor vector, which describes a discrete degree of the special factor vector ε, cov (f, ε) represents the covariance matrix of the common factor vector f and the special factor vector c.

wherein the likelihood of the defect occurring depends on the four common factors, represented by the sum of squares of the row elements of A:

$$h_i^2 = \sum_{j=1}^{4} a_{ij}^2$$

than $$\mathrm{Var}(X_i) = h_i^2 + \sigma_i^2\ (1 \le i \le 12),$$

wherein $$h_i^2$$

is contributes of common factors to the likelihood of defect occurrence, $$\sigma_i^2$$

represents the contribution of special factors to the likelihood of defect occurrence, if $X_i$ is ultimately calculated to have the highest value, the most likely defect cause is the i-th item.

wherein, based on cause of defect, defect level, defect equipment, and defect occurrence time, should eliminate key information of the defect time and automatically filled out in defect work order and dispatched to maintenance personnel.

As shown in FIG. 5, the platform control acquisition area (Zone I) only includes data acquisition and processing of the signal protection substation, remote modification of fixed values, remote switching of soft pressure plates, and other acquisition and control functions.

The specific data collection and processing method of the secure communication sub station is as follows: the C network of the secondary equipment in the interval layer is sent to the secure communication sub station in the station control layer through the secure communication sub station switch in the transmission layer. The secure communication sub station sends the secure communication data to the secure communication main station arranged in the intelligent operation and maintenance control platform control collection area (Zone I) of the power system secondary system through the dispatch data network.

The secondary equipment in the partition layer shall at least include all relay protection devices, fault recording devices, traveling wave distance measuring devices, and pressure plate monitoring devices.

Both remote modification of fixed values and remote modification of soft pressure plates are sent by the extension workstation (Zone I) of the application layer to the communication master station. The communication master station sends the communication master station to the communication sub station and then to the protection device of the interval layer, so as to modify the fixed value items that need to be modified. Before and after modification, the system verifies the fixed value according to the intelligent rules in the rule library, To check whether the modified fixed value and soft pressure plate have intelligent rules for load setting and whether they match the fixed value sheet.

The data collection of external communication substations can be divided into two methods: wired collection and wireless collection, which solve the problem of incomplete collection of external information for all secondary systems within the station, assist in judging the status of secondary system equipment, assist in fault analysis and judgment, and provide beneficial assistance for defect handling and alarm confirmation.

The advanced application development of the data management application area (Zone III) is mainly divided into six modules, namely centralized monitoring, panoramic data, data maintenance, remote inspection, intelligent scheduling, and intelligent maintenance.

Figure 7:
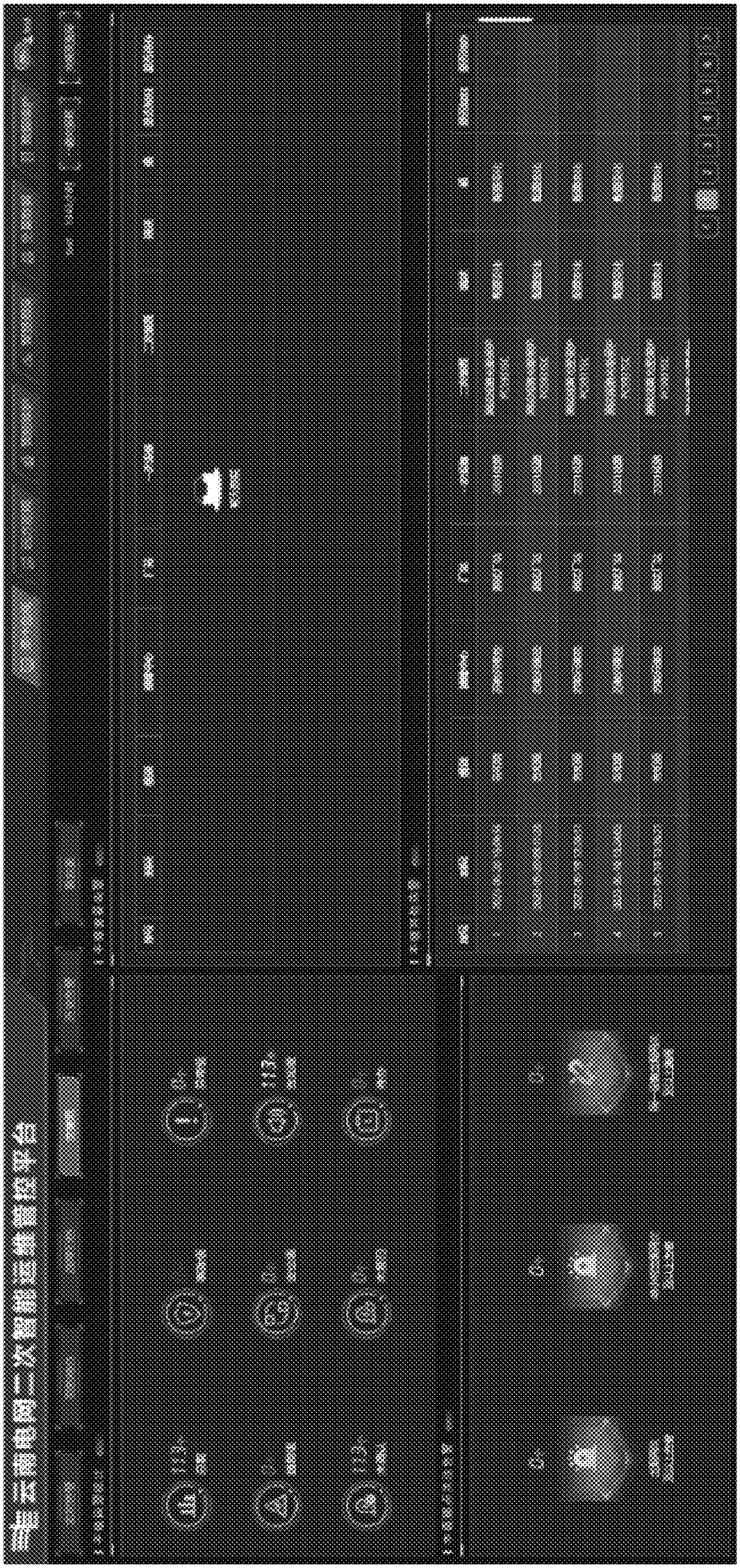
FIG. 7 shows the centralized monitoring interface of an intelligent operation and maintenance control platform for a power secondary system provided in an embodiment of the present invention.

As shown in FIG. 7, centralized monitoring mainly includes real-time alarms, historical alarms, memos, and shift handover.

Figure 6:
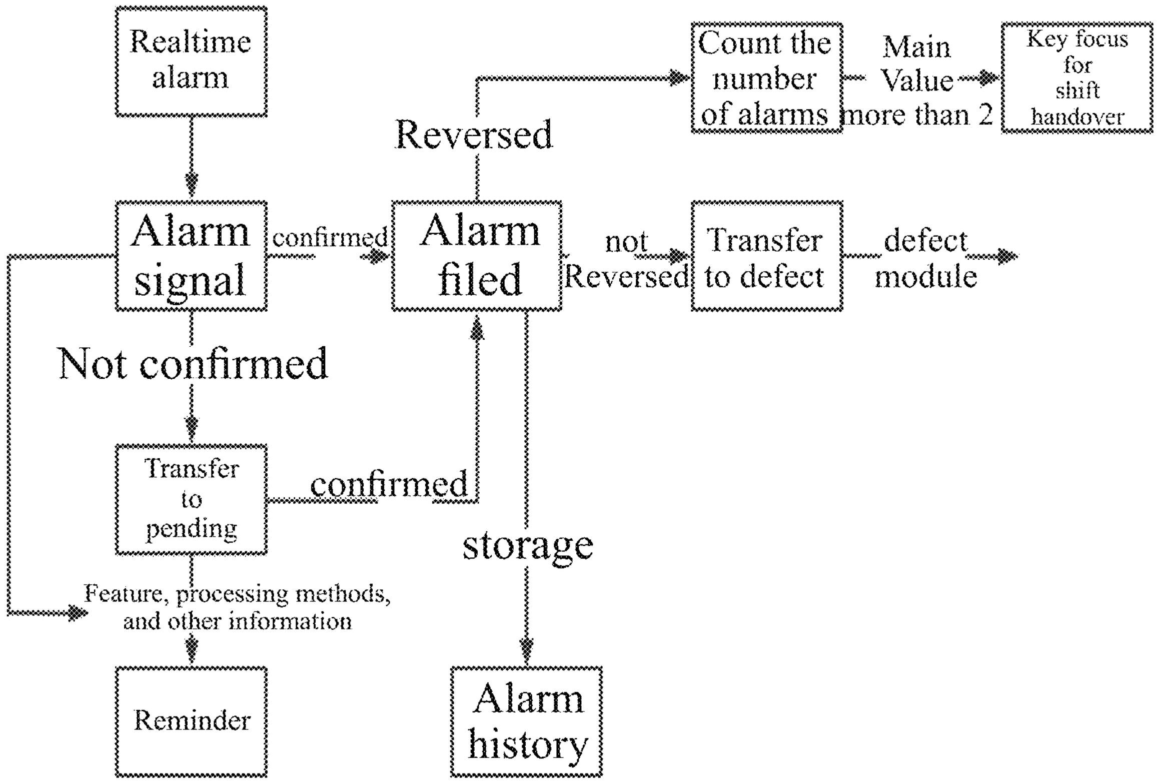
FIG. 6 shows an intelligent processing method for alarm signals on an intelligent operation and maintenance control platform for a power secondary system provided in an embodiment of the present invention.

As shown in FIG. 6, real-time alarms mainly extract alarm information based on the alarm messages sent by the security and external sub stations. Historical alarms are mainly used to judge historical alarm data based on intelligent algorithms, and to achieve the function of querying, filtering, and querying historical alarms. All archived alarm information is stored in the historical alarm module. Memos can be selected to record the characteristics or processing methods that need attention in real-time or historical alarms. When searching for historical alarms in the future, the characteristics and processing methods in the memos can be displayed to assist staff in making judgments. For real-time alarms that cannot be immediately confirmed, you can choose to transfer to the to-do area. If the staff does not click to confirm, the alarm signals in the to-do area will continue to exist, avoiding missing or forgetting key signals and alarm information. After confirming the pending alarm, it will enter the alarm archiving module.

The alarm archiving module manually confirms the alarm information and pending information before transferring them to the alarm archiving module. If the alarm archiving module checks that the alarm information has not been restored, it will be transferred to the defect module for defect elimination processing. When the alarm information has been restored, the number of times the alarm has occurred within this value will be counted. When it occurs twice or more within this value, it will be transferred to the shift handover module and handed over to the next duty monitoring personnel, The next on duty monitoring personnel should pay close attention to the alarm information. Shift handover is to conduct statistical data and intelligent analysis on the alarm information platform monitored for the previous value, with a focus on alarms that occur ≥2 times for this value. For alarm information that has not been restored in the alarm archive, the information will be transferred to the defect management module of intelligent operation and maintenance.

Figure 8:
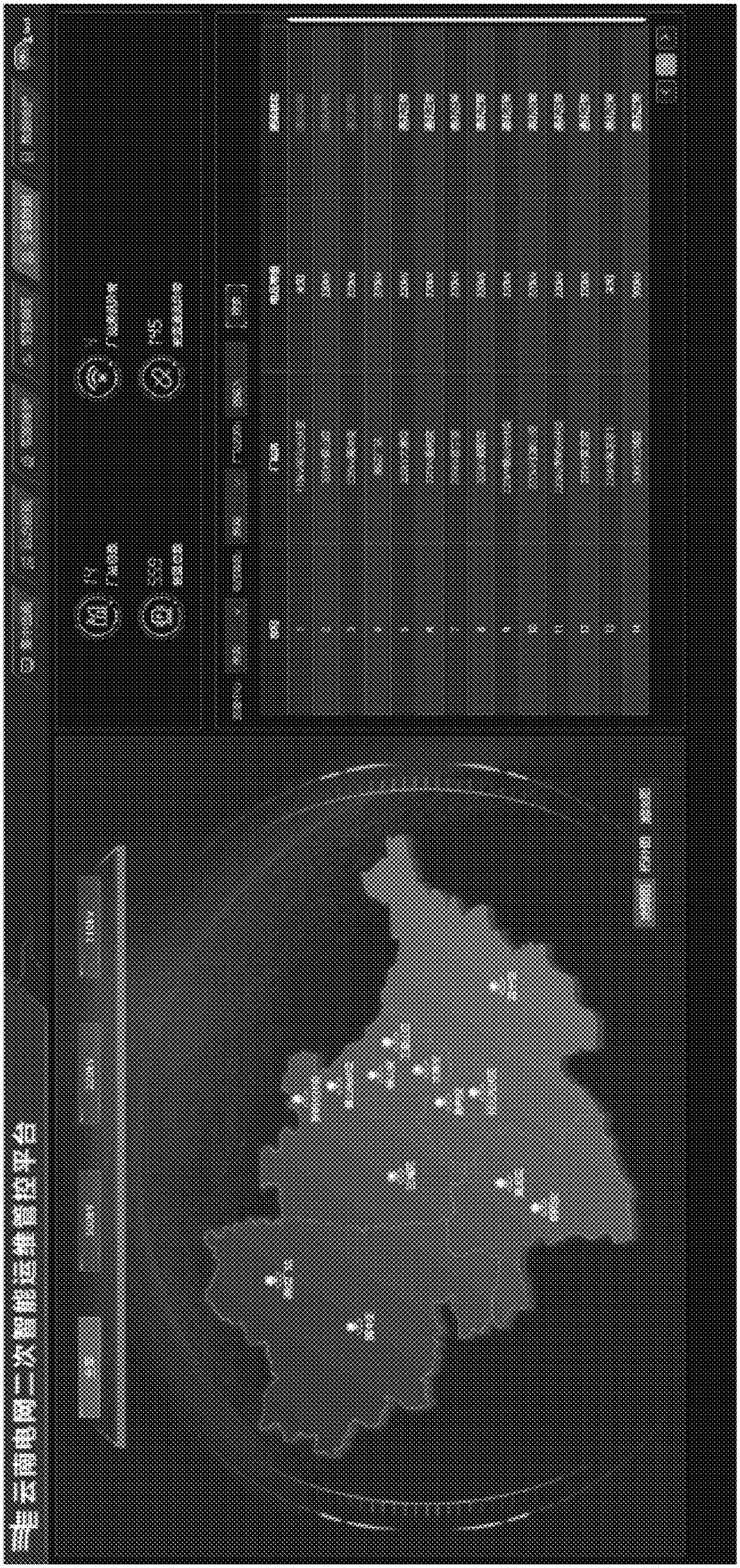
FIG. 8 shows a panoramic data interface of an intelligent operation and maintenance control platform for a power secondary system provided in an embodiment of the present invention.

As shown in FIG. 8, the panoramic data module mainly includes geographic maps, power flow maps, topology maps, substation maps, and interval maps.

The geographic map mainly displays all substations within the operation and maintenance scope and their geographical locations. Clicking on a specific substation in the geographic map will enter the substation map of that substation.

The power flow diagram mainly displays the power flow distribution of all substations within the operation and maintenance scope. The power flow data is mainly obtained through interaction between this platform, the scheduling OMS system, and the scheduling OCS system. Clicking on a specific substation in the power flow diagram will enter the substation diagram of that substation The topology diagram mainly displays the topology and architecture of this platform.

The substation diagram is the main wiring diagram of the substation within the operation and maintenance scope. Clicking on the specific interval on the main wiring diagram can enter the specific interval diagram. The substation diagram is obtained through interaction between the platform, the scheduling OMS system, and the scheduling OCS system. The diagram can display telemetry data for each interval.

The interval diagram is a schematic diagram of a specific interval in the substation, which can display all information of the secondary equipment in that interval. It can intelligently judge the operating status of the interval, whether there are alarms, whether the secondary circuit status is normal, and whether the soft and hard pressure plates are on or off according to the requirements of the load setting sheet.

Figure 9:
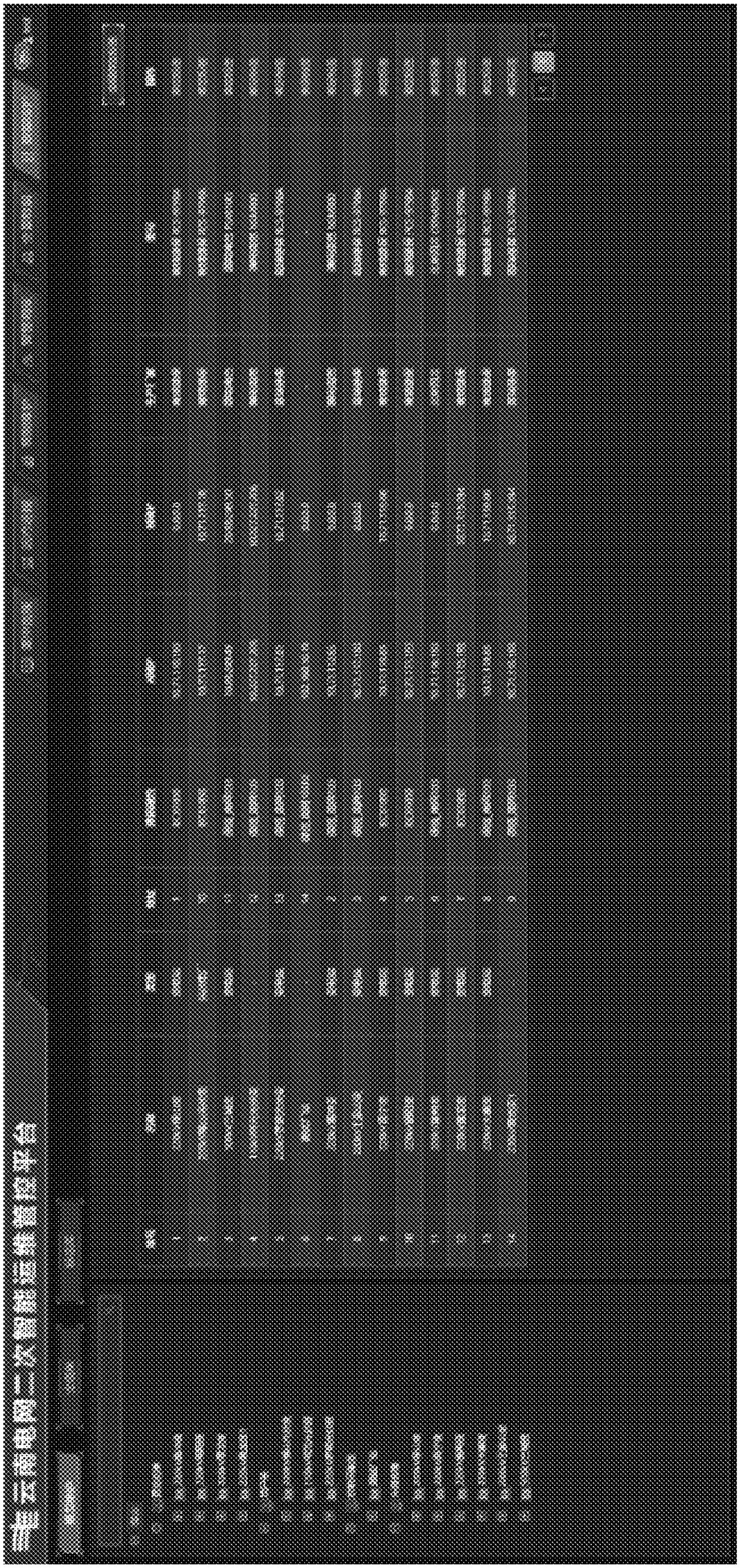
FIG. 9 shows the data maintenance interface of an intelligent operation and maintenance control platform for a power secondary system provided in an embodiment of the present invention.

As shown in FIG. 9, the data maintenance module includes a tag library, a rule library, and a syntax library.

The tag library labels the submitted data and assigns its own imprint to different data items, laying the foundation for intelligent advanced applications of data.

The rule library is designed to manually develop rules and intelligent algorithms for labeled data in the tag library. Advanced applications are developed for labeled data, such as manually inputting fixed value setting rules and intelligent calibration and verification. The platform can carry out advanced applications for intelligent calibration and verification of labeled fixed values.

The syntax library is mainly designed for data calculated by intelligent algorithms and human rules. The syntax input by humans can be output into the data needed by various professionals.

Figure 10:
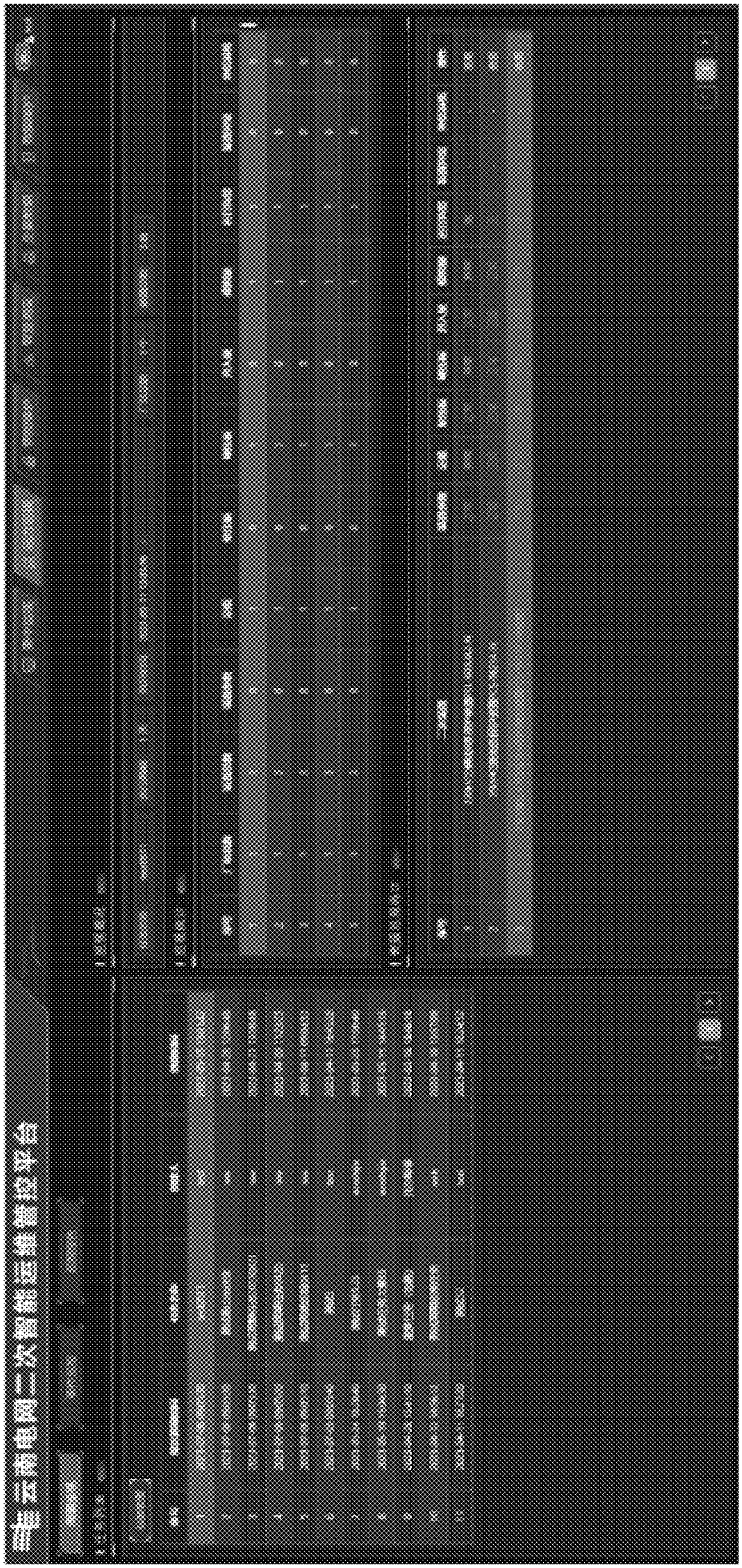
FIG. 10 shows a remote inspection interface of an intelligent operation and maintenance control platform for a power secondary system provided in an embodiment of the present invention.

As shown in FIG. 10, the remote inspection module includes periodic inspections, accident inspections, and inspection reports.

The periodic inspection can carry out daily inspections of a certain substation according to specific cycles. During the inspection, all data submitted by the substation is intercepted, and intelligent inspections are carried out according to the rules of the intelligent inspection rule library. An inspection report is generated and stored. The inspection report determines the level of abnormality based on the equipment of the abnormal event and the severity of the abnormal alarm. The first level abnormality is a red alarm, The second level anomaly is an orange alarm, the third level anomaly is a yellow alarm, and the fourth level anomaly is a blue alarm. The first level alarm is the most severe and urgent, while the fourth level alarm is the least severe and has a relatively small impact.

The data for the above inspection comes from the relay protection data collected by the relay protection substation of the substation, the external information data of the secondary system collected by the external signal substation, the power flow data obtained from the interaction between the platform and OMS system, and the four remote information obtained from the interaction between the platform and OCS system. Solved the problem of incomplete information during routine on-site inspections, failure to identify hidden dangers and defects during inspections, and low efficiency of manual inspections.

The accident inspection described is an online inspection conducted to confirm the status of primary equipment and the action of secondary equipment after a trip accident occurs, and generate an inspection report. The confirmation of the status of a primary device includes combining data from the video image monitoring system interaction, intelligently analyzing the high-definition images of the primary device, determining the energy storage status, actual position, and other information of the primary device, and then determining whether the tripped primary device has the conditions for power transmission. The analysis of the operation of secondary equipment mainly includes retrieving the current and voltage waveforms at the time of the fault sent to the relay substation, as well as the action messages and fixed values of the protection device, monitoring the status of the secondary circuit, and the on/off status of the soft and hard pressure plates. Based on the comprehensive message sent by the WEB system, the intelligent diagnosis method of fault analysis can be used to confirm whether the protection is in the correct action and whether the secondary circuit is in the normal state. The collection and analysis of information can be completed without the need for staff to go to the site, and it also avoids analysis errors caused by personnel errors, effectively improving the level of secondary operation and management.

The inspection report is a written, specific format inspection result generated by accident inspections and periodic inspections based on the intelligent inspection rule library. The inspection report has retrieval and comparison functions, which can retrieve inspection reports for various situations such as specific dates, specific intervals, and specific faults. The comparison of inspection reports mainly includes the comparison before and after the accident. The comprehensive comparison between the inspection results of this cycle and the previous cycle shows that the inspection results are accurate and reliable.

Figure 11:
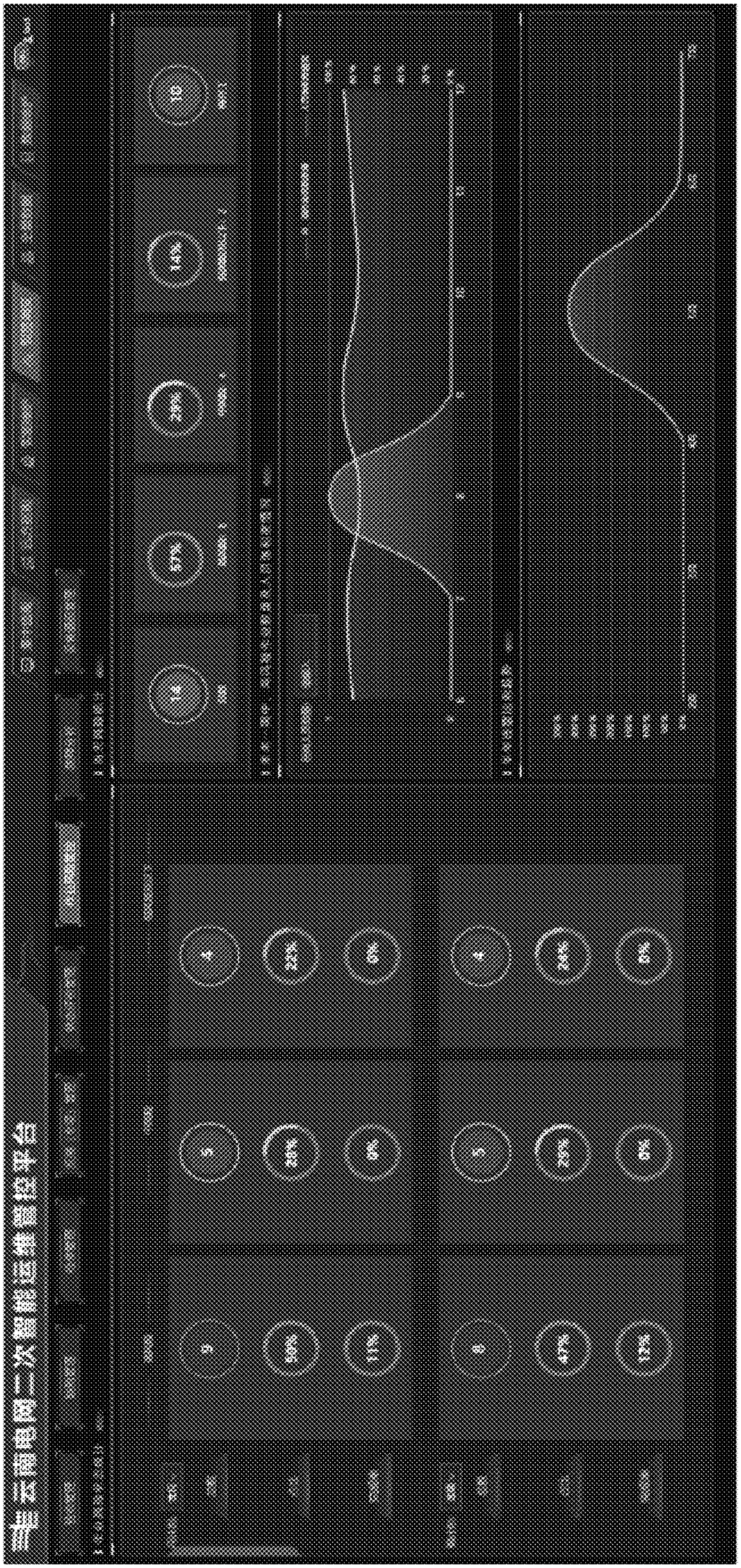
FIG. 11 shows the intelligent scheduling interface of an intelligent operation and maintenance control platform for a power secondary system provided in an embodiment of the present invention.

As shown in FIG. 11, intelligent scheduling serves the scheduling staff, including countermeasures management, fault analysis, maintenance management, defect management, status evaluation, acceptance management, risk management, and return management Counter measure management refers to the exchange of work logs, work tickets, and equipment information data through the power grid management platform. In response to anti accident measures and some special work, they are implemented on specific equipment in specific substations to monitor and manage the progress and completion of anti accident measures and special work.

Fault analysis is a comprehensive analysis and intelligent diagnosis of the power system fault situation sent at a certain time through the collection of relay protection information from the relay protection substation and external operation information from the relay protection substation, combined with the interactive image information from the video image monitoring system, and the message information from the WEB system. It can effectively determine the key information such as the fault cause, fault point, and fault distance, and provide an effective basis for dispatchers to comprehensively judge the impact of the fault and whether the power transmission conditions are met.

Maintenance management is achieved through the interaction of work ticket information and equipment information of the secondary system through the power grid management platform, thereby achieving comprehensive management of maintenance cycle, maintenance quality, and maintenance records. It solves the problems of missed inspections upon expiration, insufficient maintenance quality management, and incomplete maintenance records.

Defect management is achieved through the centralized monitoring of abnormal alarm signals that have not been reset in the module. After comprehensive analysis, the defect is transferred to the defect management module. The defect management module can view the historical defects of the equipment, the status of defects that have not been eliminated, the methods of eliminating defects that have been eliminated, and other information, and can supervise and manage the entire process of defects.

The state evaluation module in intelligent scheduling, also known as state evaluation management, is a comprehensive management system that focuses on the implementation and evaluation results of state evaluation. It mainly includes developing a state evaluation plan, combining the results of state evaluation to develop maintenance cycles and special inspection plans.

Acceptance management is the process of interacting with the OMS system's new equipment production application module to exchange new equipment production information and fixed value order information to this platform. This allows scheduling personnel to have overall control over the entire new equipment production process, and manage the acceptance status of the new equipment production process. This mainly includes reviewing acceptance records, verifying the four remote information of the main station, conducting reliability testing, and other management tasks.

Risk management is the process of generating a job list by exhaustively listing the on-site work items, types, and types, and grading the risk level of the tasks in the job list. Combined with the data exchanged between the weekly and monthly plan modules of the power grid management platform, risk grading and risk control are carried out on the weekly and monthly plans.

Return management is the control of the entire process of returning equipment that needs to be returned, including determining whether the equipment needs to be returned, whether the return process complies with regulations, whether the return appraisal results are accurate, and whether the reasons are sufficient. Professional management personnel are dispatched to comprehensively manage the above information.

Figure 12:
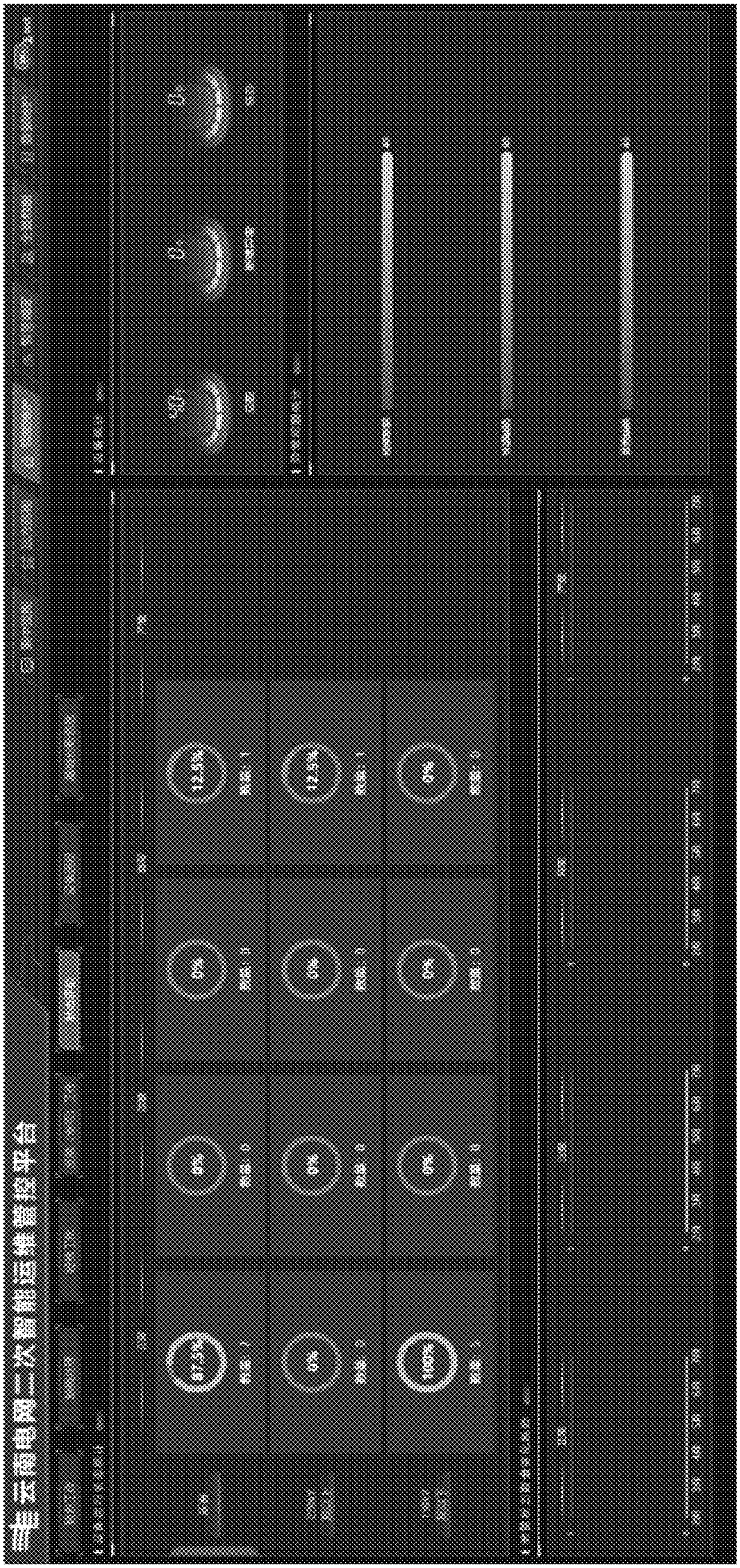
FIG. 12 shows the intelligent maintenance interface of an intelligent operation and maintenance control platform for a power secondary system provided in an embodiment of the present invention.

As shown in FIG. 12, intelligent maintenance provides services for maintenance and operation personnel, including countermeasures, maintenance work, ledger information, defect handling, status evaluation, acceptance work, and equipment return. Countermeasures mainly refer to the power outage maintenance application data exchanged by the OMS system when maintenance personnel carry out countermeasures plans and special work, and then determine the countermeasures and special work that need to be carried out in conjunction with the power outage. After rectification, it is necessary to enter the system on the platform and complete the closed-loop.

Maintenance work refers to the ability of maintenance personnel to query information on maintenance intervals during maintenance work, and to conduct comprehensive analysis based on status evaluation results, as well as whether there are defects, alarm signals, and other abnormal situations. In order to solve the above problems, targeted maintenance work is carried out to improve the quality of secondary equipment maintenance.

Ledger information is the equipment ledger data obtained through the interaction between this platform and the equipment ledger module of the power grid management platform, including program version, commissioning date, equipment status, maintenance date, defect record, etc., providing a basis for the full lifecycle management of secondary equipment.

State evaluation is based on intelligent algorithms to evaluate the status of secondary equipment in a substation. The data of secondary equipment is obtained through interaction between the platform and the equipment ledger module of the power grid management platform. The intelligent algorithm for state evaluation needs to fully consider information such as the operating years, number of defects, software versions, and load conditions of the equipment. The results of state evaluation serve as a criterion for the maintenance cycle of the maintenance management module, When the equipment status results in poor status, more frequent maintenance work is needed to ensure the normal operation of the equipment.

The return management combines the data exchanged between the equipment ledger module of the power grid management platform and the status evaluation module of this platform. Through comprehensive judgment, when the equipment exceeds the specified operating period and the status evaluation is poor, and when carrying out technical renovation work, it is necessary to return the equipment, the return information should be filled in the equipment return module of this platform, and retirement appraisal should be carried out. When the residual value is high, the equipment should be recycled. When the residual value is low, Scrap the equipment.

Acceptance management refers to the acceptance work carried out by maintenance personnel for new equipment that is about to be put into operation. The acceptance work is carried out according to the acceptance plan and requires the entry of acceptance and rectification records in the system. Production can only be carried out after passing the acceptance inspection.

Example 2

The second embodiment of the present invention provides an intelligent operation and maintenance control platform for power secondary systems. In order to verify the beneficial effects of the present invention, scientific verification is conducted through experiments.

Maintenance work needs to be carried out in a targeted manner in the maintenance work module of this platform, combining the results of status evaluation, defect records, and abnormal alarm information. After the maintenance is completed, it is necessary to close the loop within the platform and fill in the maintenance record. Finally, the scheduling management personnel inspect the maintenance records and review the equipment status after maintenance, and finally provide a maintenance evaluation.

TABLE 1

| Maintenance Score | | |
|---|---|---|
| Evaluation items | Evaluation criterion | notes |
| Are there any remaining defects in the equipment after maintenance | Is there any abnormal alarm in the equipment after maintenance? 40 points will be deducted for first level alarm, 30 points will be deducted for second level alarm, 20 points will be deducted for third level alarm, and 10 points will be deducted for fourth level alarm (upper limit of 40 points) | |
| Check if the homework instructions are filled out correctly | Check if the maintenance operation manual is filled out correctly. If there is an error in the maintenance operation manual, 2 points will be deducted. The maximum score for this project is 20 points | The sampling ratio of the 500 kV voltage level maintenance operation manual is less than or equal to 40%, the sampling ratio of the 220 kV voltage level maintenance operation manual is less than or equal to 30%, and the sampling ratio of the 110 kV voltage level maintenance operation manual is less than or equal to 20%, The sampling ratio of the maintenance operation manual for 35 kV and 10 kV voltage levels is less than or equal to 10% |

TABLE 1-continued

| Maintenance Score | | |
|---|---|---|
| Evaluation items | Evaluation criterion | notes |
| Is the maintenance project carried out safely | During the inspection process, 10 points will be deducted for each unfinished project, and the maximum score for this project is 20 points | |
| Did any violations occur during the maintenance process | During the maintenance process, 20 points will be deducted for Class A and B violations, 5 points will be deducted for Class C violations, and 2 points will be deducted for Class D violations. The maximum score for this project is 20 points | |

It should be noted that the above embodiments are only used to illustrate the technical solution of the present invention and not to limit it. Although the present invention has been described in detail with reference to preferred embodiments, ordinary technical personnel in the art should understand that the technical solution of the present invention can be modified or equivalently replaced without departing from the spirit and scope of the technical solution of the present invention, which should be covered within the scope of the claims of the present invention.

Example 3

The third embodiment of the present invention differs from the first two embodiments in that:

If the functions are implemented in the form of software functional units and sold or used as independent products, they can be stored in a computer-readable storage medium. Based on this understanding, the technical solution of the present invention can essentially or in other words, contribute to the existing technology or be reflected in the form of a software product, which is stored in a storage medium, including several instructions to enable a computer device (which can be a personal computer, server, or network device, etc.) to perform all or part of the steps of the methods described in various embodiments of the present invention. The aforementioned storage media include: USB flash drives, portable hard drives, Read Only Memory (ROM), Random Access Memory (RAM), disks or CDs, and other media that can store program code.

The logic and/or steps represented in a flowchart or otherwise described here, for example, a ordered list of executable instructions that can be considered to implement logical functions, which can be specifically implemented in any computer-readable medium for instruction execution systems The use of devices or devices (such as computer-based systems, systems including processors, or other systems that can fetch and execute instructions from instruction execution systems, devices or devices), or in combination with these instruction execution systems, devices or devices. For the purpose of this manual, "computer-readable medium" may refer to any device that can contain, store, communicate, propagate, or transmit programs for use by or in conjunction with instruction execution systems, devices, or devices.

More specific examples of computer-readable media (non exhaustive list) include the following: electrical connectors (electronic devices) with one or more wiring, portable computer cartridges (magnetic devices), random access memory (RAM), read-only memory (ROM), erasable editable read-only memory (EPROM or flash memory), fiber optic devices, and portable optical disc read-only memory (CDROM). In addition, computer-readable media can even be paper or other suitable media on which the program can be printed, as the program can be obtained electronically, for example, by optical scanning of the paper or other media, followed by editing, interpretation, or other appropriate processing as necessary, and then stored in computer memory.

It should be understood that the various parts of the present invention can be implemented using hardware, software, firmware, or a combination of them. In the above embodiments, multiple steps or methods may be implemented using software or firmware stored in memory and executed by an appropriate instruction execution system. For example, if implemented in hardware, as in another implementation, any one or a combination of the following techniques commonly known in the art can be used: discrete logic circuits with logic gates for implementing logic functions on data signals, specialized integrated circuits with appropriate combination logic gates, programmable gate arrays (PGA), field programmable gate arrays (FPGA), etc.

It should be noted that the above embodiments are provided for the purpose of illustrating the technical solution of the present invention and should not be considered as limiting. Although reference has been made to preferred embodiments for a detailed description of the present invention, those skilled in the art should understand that modifications or equivalent replacements can be made to the technical solution of the present invention without departing from the spirit and scope of the invention, all of which are encompassed within the scope of the claims of the present invention.

What is claimed is:

1. An intelligent operation and maintenance control platform for secondary power system, comprising:

an interval layer;

a transmission layer;

a station control layer;

a platform layer;

a system layer;

an application layer; and a disaster recovery backup centre, wherein the interval layer comprising all wired transmitting secondary equipment and wireless transmission collection units in a substation, wherein the secondary equipment comprises:

a protection device;

a fault recording device;

a traveling wave distance measurement device;

a pressing plate monitoring device;

a power quality device; and an AC/DC system, and the data from the second equipment is transmitted to a wired transmission layer via a wired transmission;

wherein the wireless transmission collection units comprise a MEMS power supply and communication module;

a MEMS microsensor; and a MEMS micro actuator, and the wireless transmission collection units collect external operational information of a secondary system, which is transmitted wirelessly within the substation, through a microelectromechanical system and radio frequency MEMS technology, and the wireless transmission collection units are connected to a wireless transmission layer, and the wireless transmission collection units send the collected external operational information of the secondary system to a wireless receiving host of the wireless transmission layer, wherein the external operational information of the secondary system is an operation status information of associated equipment of the secondary system, a behaviour information of an on-site operation personnel of a relay protection device, and an environmental information of the substation.

2. The intelligent operation and maintenance control platform for secondary power system according to claim 1, wherein the transmission layer connects the interval layer and the station control layer, forwarding the data from the interval layer to the station control layer, wherein the transmission layer comprises:

the wired transmission layer; and the wireless transmission layer, wherein the wired transmission layer comprises:

a Zone I wired transmission layer; and a Zone III wired transmission layer, wherein the Zone I wired transmission layer comprises:

a secure communication sub station switch; and a secure communication sub station communication acquisition module, wherein the secure communication sub station switch and a secondary equipment of an in-station communication protocol are connected, wherein the secure communication sub station communication acquisition module and the secondary equipment of the in-station communication protocol are connected, wherein the Zone III wired transmission layer comprises an external communication sub station switch, which is connected to an interval layer equipment of a communication protocol, which transmits data on an external communication sub station, and the external communication sub station switch transmits data of the interval layer equipment to the external communication sub station, wherein the wireless transmission layer comprises the wireless receiving host, which collects data sent by the wireless transmission collection units, and components of the wireless receiving host comprises:

an antenna;

a radio frequency front-end;

an intermediate frequency amplifier;

an intermediate frequency filter;

an envelope detector; and a demodulator.

3. The intelligent operation and maintenance control platform for secondary power system according to claim 2, wherein the station control layer comprises:

a secure communication sub station; and the external communication sub station, wherein the secure communication sub station serves as a link between the interval layer and a main station platform through the transmission layer, and through the transmission layer, a command is sent to the interval layer to change a fixed value status and a pressing plate status of the secondary equipment, wherein the external communication sub station collects the external operational information of the secondary system, and the external communication sub station has a data acquisition function, and the external communication sub station collects external operational information of the secondary system sent on the wired transmission layer through the external communication sub station switch of the transmission layer, and the external operational information of the secondary system comprises:

a AC/DC system information; and a power quality information, wherein collecting external operational information of the secondary system transmitted on the wireless transmission layer, comprising information that cannot be transmitted through wired transmission in strong interference environments inside an outdoor switch field, and the external communication sub station does not have control functions, wherein the secure communication sub station in the station control layer is arranged in Zone I of a security zone, connected to a Zone I platform of the platform layer through a dispatch data network, and the external communication sub station is arranged in Zone III of the security zone, connected to a Zone III platform of the platform layer through a comprehensive data network, and the dispatch data network and the comprehensive data network have a longitudinal encryption device, wherein the station control layer receives control commands issued by the Zone I of the security zone of the platform layer and forwards them to the interval layer through the transmission layer, achieving a control function of the platform layer on the equipment in the interval layer of the substation, wherein the station control layer receives data sent by the interval layer through the transmission layer and sends it to the platform layer.

4. The intelligent operation and maintenance control platform for secondary power system according to claim 3, wherein the platform layer is connected to the station control layer, and receives data sent by the station control layer, and sends control commands to the station control layer through the Zone I of the security zone, and connects to the system layer, and has data interaction with the system layer, wherein the platform layer comprises:

a control collection area; and a data management application area, and the control collection area comprises a control function which collects secure communication data verify the station control layer, and ensures the security of control and security of data collection, and the data management application area comprises collecting and developing advanced application of external communication data, and deep data mining, wherein the control collection area and the data management application area are connected through a forward isolation device and a reverse isolation device, and the forward isolation device and the reverse isolation device are used to isolate data exchange between the Zone I of the security zone and the Zone III of the security zone, using a TCP penetration method of a forward isolation.

5. The intelligent operation and maintenance control platform for secondary power system according to claim 4, wherein the TCP penetration method of the forward isolation comprises:

establishing a xb.tcp penetration adapter and a TCP_svr forward receiver in the Zone I of the security zone server; and establishing a xb.tcp adapter in the Zone III of the security zone server, wherein a path 1 of the platform's control collection area is to send standard TCP message to the TCP_svr forward receiver and converts to xb_tcp message, and send to the xb.tcp penetration adapter, wherein a path 2 of the platform's control collection area is directly sending the xb_tcp message to the xb.tcp penetration adapter, and the xb.tcp penetration adapter generates a forward driver and establishes a TCP mapping with the data management application area server, and a one-way TCP message is sent to a specific port of the xb.tcp adapter in the data management application area through the forward isolation device, and, finally, the platform data management application area stores and decodes the data, wherein the TCP penetration method of the forward isolation adopts xb_gl_proxy implementation, wherein a configuration item is:

establish mapping of CHANNEL SVR of the data management application area in the control collection area, $$\text{CHANNEL REMOTE SVR} = 10.10.10.2\text{: } xxxx$$

an adapter service port, $$\text{PROXY PORT} = XXXX;$$

wherein the control collection area tcp is connected to the xxxx port of the service, and, through a xb penetration mechanism, it is equivalent to connecting to a user machine in the data management application area, $$zf1 = xxxx192.1.1.2\text{: } xxxx,$$

wherein the control collection area receives remote control commands from a power dispatch automation OCS system and send the remote control commands to the secure communication sub station of the station control layer, comprising remote control modification of fixed values and remote control of soft pressing plate, wherein the data management application area is connected to an OMS system, and the data application area retrieves corresponding fixed value orders and power outage application forms from the OMS system, and sends conclusions of real-time data on station side and opinions of application approval personnel to a power outage application module of the OMS system, wherein the data management application area is connected to a power grid management system and retrieves equipment ledger data from the power grid management system, wherein the data management application area is connected to a video image monitoring system, which retrieves videos of the substation internal environment, operators, and equipment before and after a moment of fault, and, based on an environmental status, an equipment status, and human behavior, a pre fault accident analysis is carried out to determine whether the fault occurred due to environmental, equipment, and human factors, and, after the fault, videos of environment status and equipment status are used, and quickly determines whether there are conditions for power restoration and reduce power outage time, wherein the data management application area is connected to a substation management platform, and an analysis result data obtained from an advanced application is sent to the substation management platform.

6. The intelligent operation and maintenance control platform for secondary power system according to claim 5, wherein the application layer and the platform layer are directly connected, wherein the application layer comprises scheduling, operation, and maintenance extension workstations, wherein the disaster recovery backup centre comprises:

a disaster recovery system; and a storage backup system.

7. The intelligent operation and maintenance control platform for secondary power system according to claim 6, wherein the advanced application comprises:

a device lifecycle management; and a defect modelling, wherein the device lifecycle management comprises:

carrying out acceptance of equipment to be put into operation;

recording an acceptance record in an acceptance management module of a platform, and closing loop of an acceptance plan;

putting the equipment into operation after passing the acceptance;

rectifying by a construction unit if the acceptance is not qualified;

putting the new equipment that has passed the acceptance into production; and carrying out maintenance work during production.

8. The intelligent operation and maintenance control platform for secondary power system according to claim 7, wherein the defect modeling comprises:

a platform defect management module collecting abnormal alarm signals from a remote inspection module or a centralized monitoring module; and a defect management module automatically collecting key information of alarms based on an alarm information, wherein the key information comprises:

a device name;

an alarm level;

an alarm representation; and an alarm logic, wherein the alarm representation is analyzed and judged based on the alarm logic in a rule library of a platform accessing device, combined with the alarm level to detect the abnormal alarm signals, wherein the alarm logic comprises:

a numerical alarm; and a status alarm, wherein the numerical alarm comprises:

values that have reached or not reached a first threshold, and are compared by calculating an actual value and setting an alarm value;

when the calculation result conforms to a logic, an alarm is confirmed and automatically transferred to a defect module;

when the calculation result does not conform to the logic, it is a false alarm and the logic ends;

when a main system detects an overload alarm from a main transformer protection, an alarm logic module retrieves a setting value of the main transformer protection overload from the rule library, and combines real-time current analysis to determine whether an alarm setting value has been reached;

if the alarm setting value is reached, confirm the alarm and switch to the defect module; and if the alarm setting value is not reached, it is judged as a false alarm and the logic ends, wherein the status alarm comprises:

an alarm signal issued by a detection device for abnormal state;

perform secondary confirmation of device name and status based on alarm signals;

if device status meets an alarm information, confirm an alarm and automatically convert it to the defect module, automatically convert the key information of an alarm signal into defect factors, and at the same time, retrieve an operating information of an alarm device and conduct defect modeling, $$X_i = \mu_i + a_{i1}f_{i1} + a_{i2}f_{i2} + a_{i3}f_{i3} + a_{i4}f_{i4} + \varepsilon_i (1 < i \le 12)$$

while the $X_i$ (1≤i≤12) represents 12 possible causes of defects, comprising:

plug-in damage;

loose terminals;

incorrect labeling;

program jamming;

incorrect secondary circuit connections;

air switch tripping;

insulation abnormalities;

parasitic circuits;

water ingress into auxiliary components;

damage to auxiliary components;

program vulnerabilities; and incorrect alarm definitions, and $f_1$, $f_2$, $f_3$, and $f_4$ represent four common factors, $a_j$ is $X_i$ is load in common factor $f_i$, and $\mu_i$ is the mean of $X_i$, $\varepsilon_i$ represents other factors that do not belong to the common factor;

transform the above equation and calculate it using a matrix method to get:

$$X = \mu + Af + \varepsilon$$

while $f=(f_1, f_2, f_3, f_4)$ is common factor vector, and $\varepsilon=(\varepsilon_1, \varepsilon_2, \ldots; €_{12})$ is special factor vector;

then $A_{12\times4}=a_{ij}$ (1≤i≤12), (1≤j<4) is cause of defect occurrence of factor load matrix, rank of matrix A is m, when fulfilling:

$$E(f) = 0,$$

$$E(\varepsilon) = 0,$$

$$\mathrm{Var}(f) = I,$$

$$\mathrm{Var}(\varepsilon) = D = \mathrm{diag}(\sigma_1^2, \sigma_2^2, \ldots, \sigma_p^2), 1 \le p \le 12, \text{ and}$$

$$\mathrm{cov}(f, \varepsilon) = E(f\varepsilon) = 0, \text{ than}$$

$$\mathrm{Var}(x) = E[(X-\mu)(X-\mu)'] = AA' + D,$$

and element $a_{ij}$ of A is a covariance between a likelihood of defect occurrence and a common factor fi:

$$a_{ij} = \mathrm{cov}(X_i, f_i) = \rho(X_i, f_i)$$

wherein E(f) represents comprehensive expectation of discrete common factor vector $f_1$-$f_4$, E (ε) represents comprehensive expectation of discrete special factor vector, Var(s) is the variance of a special factor vector, which describes a discrete degree of the special factor vector ε, cov (f, ε) represents the covariance matrix of the common factor vector f and the special factor vector ε;

wherein the likelihood of the defect occurring depends on the four common factors, represented by the sum of squares of the row elements of A:

$$h_i^2 = \sum_{j=1}^{4} a_{ij}^2$$

than $$\mathrm{Var}(X_i) = h_i^2 + \sigma_i^2 \ (1 \le i \le 12),$$

wherein $$h_i^2$$

is contributes of common factors to the likelihood of defect occurrence, $$\sigma_i^2$$

represents the contribution of special factors to the likelihood of defect occurrence, if $X_i$ is ultimately calculated to have the highest value, the most likely defect cause is the i-th item;

wherein, based on cause of defect, defect level, defect equipment, and defect occurrence time, should eliminate key information of the defect time and automatically filled out in defect work order and dispatched to maintenance personnel.

* * * * *